United States Patent
Kim

(10) Patent No.: US 10,020,567 B2
(45) Date of Patent: Jul. 10, 2018

(54) ANTENNA AND VEHICLE HAVING THE ANTENNA

(71) Applicant: HYUNDAI MOTOR COMPANY, Seoul (KR)

(72) Inventor: Dongjin Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 13 days.

(21) Appl. No.: 15/385,261

(22) Filed: Dec. 20, 2016

(65) Prior Publication Data

US 2018/0062251 A1 Mar. 1, 2018

(30) Foreign Application Priority Data

Sep. 1, 2016 (KR) .................. 10-2016-0112487

(51) Int. Cl.
| | |
|---|---|
| *H01Q 13/10* | (2006.01) |
| *H01Q 1/32* | (2006.01) |
| *H01Q 3/24* | (2006.01) |
| *H01Q 1/42* | (2006.01) |
| *H01Q 5/307* | (2015.01) |
| *H01Q 5/30* | (2015.01) |

(Continued)

(52) U.S. Cl.
CPC ............ *H01Q 1/3291* (2013.01); *H01Q 1/42* (2013.01); *H01Q 3/24* (2013.01); *H01Q 5/30* (2015.01); *H01Q 5/307* (2015.01); *H01Q 13/10* (2013.01); *H01Q 13/12* (2013.01); *H01Q 13/18* (2013.01); *G01S 13/931* (2013.01); *G08G 1/16* (2013.01)

(58) Field of Classification Search
CPC .......... H01Q 5/30; H01Q 5/307; H01Q 13/10; H01Q 13/12; H01Q 13/18; H01Q 1/3291; H01Q 3/24

See application file for complete search history.

(56) References Cited

U.S. PATENT DOCUMENTS 6,356,241 B1 * 3/2002 Jaeger ................ H01Q 13/0275
343/776

FOREIGN PATENT DOCUMENTS

| JP | 1993-069323 A | 3/1993 |
|---|---|---|
| JP | 2005-073176 A | 3/2005 |

OTHER PUBLICATIONS

Office Action issued in corresponding Korean Patent Application No. 10-2016-0112487, dated Oct. 19, 2017.

(Continued)

*Primary Examiner* — Hoang Nguyen
(74) *Attorney, Agent, or Firm* — McDermott Will & Emery LLP

(57) ABSTRACT

An antenna includes a first antenna body formed as a hollow cylindrical shape having a first outer surface, a first inner surface and a first radiation surface formed in a circular shape, a second antenna body accommodating the first antenna body inside the second antenna body, the second antenna body formed as a hollow cylindrical shape with a second outer surface, a second inner surface and a second radiation surface formed in a ring shape, a plurality of first partitions, and a plurality of second partitions, wherein a plurality of first radiation apertures, formed by the plurality of first partitions for radiating a first radio wave, is formed on the first radiation surface, and a plurality of second radiation apertures, formed by the plurality of second partitions for radiating a second radio wave, is formed on the second radiation surface.

20 Claims, 26 Drawing Sheets

(51) Int. Cl.
*H01Q 13/12* (2006.01)
*H01Q 13/18* (2006.01)
*G08G 1/16* (2006.01)
*G01S 13/93* (2006.01)

(56) References Cited

OTHER PUBLICATIONS

12 GHz Circular Microstrip Array, JPEG, Photograph by Pierre Dufilie, Apr. 2003. http://www.ecs.umass.edu/ece/pozar/Full%20Circular.jpg.

S. Park et al., "Antenna Selection and Power Control Method for Uniform Circular Array Antennas Beamforming" The Journal of the Korea Institue of Intelligent Transport Systems, vol. 14, Issue 1.2015. pp. 68-76. http://dx.doi.org/10.12815/kits.2015.14.1.068 (w/ English abstract).

"Beam Switching Cylindrical Array Antenna System" vol. 8, No. 2, Apr. 2000. <http://www.drdo.gov.in/drdo/pub/techfocus/apr2000/beam%20Switching.htm>.

M. Lee et al., "Design of L-Band Cylindrical Active Phase Array Antenna Using Bent Dipoles" Journal of the Institute of Electronics and Information Engineers, 50(6), 2013.6, 43-55. (w/ English abstract).

Notice of Allowance issued in Korean Patent Application No. 10-2016-0112487, dated Mar. 16, 2018 (English translation).

\* cited by examiner

ANTENNA AND VEHICLE HAVING THE ANTENNA

CROSS-REFERENCE TO RELATED APPLICATION

This application claims the benefit of priority to Korean Patent Application No. 10-2016-0112487, filed on Sep. 1, 2016 with the Korean Intellectual Property Office, the disclosure of which is incorporated herein by reference.

TECHNICAL FIELD

Embodiments of the present disclosure relate to an antenna and a vehicle having the antenna, and more particularly to an antenna able to generate a variety of radial patterns and a vehicle having the antenna.

BACKGROUND

A vehicle enables transportation on the road using fossil fuel and electricity as a power source.

Recently, it has been common for the vehicle to include an audio device and a video device to allow a driver to listen to music and to watch videos, as well as to simply transport cargo and people. Further, a navigation system has been widely installed in vehicles to display a route to a destination that is desired by the driver.

Recently, there is a growing need for the vehicle to communicate with an external device. For example, in the case of a navigation function, to guide the route to the destination, information about the traffic conditions of the road is required to find the optimal route. Since the traffic conditions frequently change, it may be required for the vehicle to acquire the information about the traffic conditions in real time.

In addition the system for driver's safety has been actively developed, e.g. Forward Collision Warning System (FCWS) and Autonomous Emergency Braking (AEB) for ensuring the safety of the driver and for providing convenience to the driver. The Forward Collision Warning System (FCWS) and Autonomous Emergency Braking (AEB) may estimate whether a collision with a proceeding vehicle is likely and a collision estimated time based on location information of the proceeding vehicle detected by a radar device.

A communication device for communication with the external device and a radar device for the forward collision warning includes an antenna configured to send and receive radio waves.

A car antenna technology currently on the market is limited to a patch antenna array. This is because it is possible to implement a light weight and a thin antenna in such an array. However, for the patch array antenna, there may be a dielectric loss caused by the use of a dielectric substrate and thus the performance of the antenna is significantly reduced due to the dielectric loss. In particular, in 5G communication technology or the radar using several tens of GHz or more as a high frequency, the efficiency of the patch antenna is less than 30%. In addition, the patch array antenna uses a feeding structure in series and thus the patch array antenna has an extremely narrow frequency band characteristic.

SUMMARY

Therefore, it is an aspect of the present disclosure to provide an antenna capable of minimizing a space occupied by the antenna and a vehicle having the same.

It is another aspect of the present disclosure to provide an antenna having a shape similar with a cable transmitting a high frequency electrical signal and a vehicle having the same.

It is another aspect of the present disclosure to provide an antenna capable of outputting radio waves having a directional radial pattern and a vehicle having the same.

It is another aspect of the present disclosure to provide an antenna structure having a plurality of antennas capable of outputting radio waves having a directional radial pattern and a vehicle having the same.

Additional aspects of the present disclosure will be set forth in part in the description which follows and, in part, will be obvious from the description, or may be learned by practice of the present disclosure.

In accordance with one aspect of an exemplary embodiment, an antenna may include a first antenna body formed in a hollow cylindrical shape with a first outer surface, a first inner surface and a first radiation surface in a circular shape, a second antenna body accommodating the first antenna body inside the second antenna body and formed in a hollow cylindrical shape with a second outer surface, a second inner surface and a second radiation surface in a ring shape, a plurality of first partitions protruded from the first inner surface to a central axis of the first antenna body and a plurality of second partitions protruded from the second inner surface to the first outer surface of the first antenna body. A plurality of first radiation apertures formed by the plurality of first partitions and configured to radiate a first radio wave may be formed in the first radiation surface, and a plurality of second radiation apertures formed by the plurality of second partitions and configured to radiate a second radio wave may be formed in the second radiation surface.

The plurality of the first radiation apertures may be apart from each other by the same distance along the first inner surface of the first antenna body.

Each of the first radiation apertures may have a sector shape in which the central axis of the first antenna body corresponds to a vertex.

The plurality of the first partitions may make contact with each other in the central axis of the first antenna body.

A cross section of each of the first partitions in the first radiation surface may have a sector shape, and each of the first partitions may have a sector-shaped cone shape, which is extended from the first radiation surface along the first inner surface.

A cross section of each of the first partitions in the first radiation surface may have a sector shape, and each of the first partitions may have a sector-shaped cylindrical shape, which is extended from the first radiation surface along the first inner surface.

Each of the first partitions may be extended from the first inner surface to the central axis of the first antenna body along the first radiation surface and a length protruded toward the central axis may vary inversely with a distance from the first radiation surface.

Each of the first partitions may be extended from the first inner surface to the central axis of the first antenna body along the first radiation surface and a length protruded toward the central axis may be constant.

The plurality of the second radiation apertures may be apart from each other by the same distance along the second inner surface of the second antenna body.

The plurality of the second radiation apertures may be formed between the first outer surface of the first antenna body and the second inner surface of the second antenna body.

The plurality of the second radiation apertures may have a ring shape that is cut by the second partition.

Each of the second partitions may be extended from the second inner surface to the central axis of the second antenna body along the second radiation surface and a width of the second partition may vary inversely with a distance from the second radiation surface.

Each of the second partitions may be extended from the second inner surface to the central axis of the second antenna body along the second radiation surface and a width of the second partition may be constant.

In accordance with one aspect of an exemplary embodiment, a vehicle may include a first antenna and a second antenna, and a selection controller configure to activate any one of the first antenna and the second antenna. The first antenna may included a first antenna body formed in a hollow cylindrical shape with a first outer surface, a first inner surface and a first radiation surface in a circular shape, and a plurality of first partitions protruded from the first inner surface to a central axis of the first antenna body. The second antenna may include a second antenna body configured to accommodate the first antenna body inside the second antenna body, and formed in a hollow cylindrical shape with a second outer surface, a second inner surface and a second radiation surface in a ring shape, and a plurality of second partitions protruded from the second inner surface to the first outer surface of the first antenna body. A plurality of first radiation apertures formed by the plurality of first partitions and configured to radiate a first radio wave may be formed in the first radiation surface, and a plurality of second radiation apertures formed by the plurality of second partitions and configured to radiate a second radio wave may be formed in the second radiation surface.

The plurality of the first and second radiation apertures may be apart from each other by the same distance along the first and second inner surface.

Each of the plurality of the first radiation apertures may have a sector shape in which the central axis of the first antenna body corresponds to vertex.

The plurality of the first partitions may make contact with each other in the central axis of the first antenna body.

The plurality of the second radiation apertures may be formed between the first outer surface of the first antenna body and the second inner surface of the second antenna body.

The first antenna may further include a first feeding pin provided inside of the first antenna body and configured to radiate the first radio wave to the inside of the first antenna body. The second antenna may further include a second feeding pin provided between the first antenna body and the second antenna body and configured to radiate the second radio wave to between the first antenna body and the second antenna body.

A first radio wave radiated from the first feeding pin may be divided by the plurality of the first partitions and radiated via the plurality of the first radiation apertures. A second radio wave radiated from the second feeding pin may be divided by the plurality of the second partitions and radiated via the plurality of the second radiation apertures.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
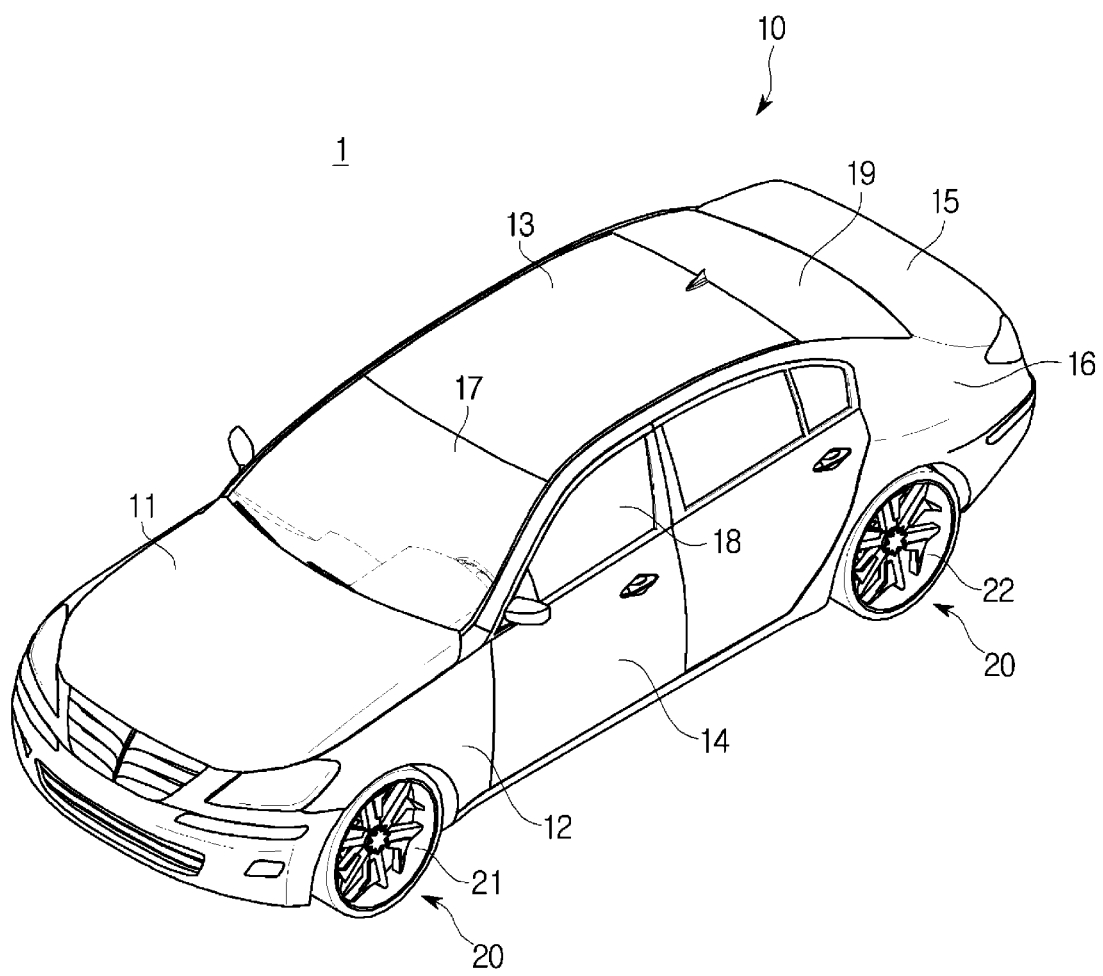
FIG. 1 is a view illustrating an exterior of a vehicle in accordance with exemplary embodiments of the present disclosure.

The present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

Parts which are not associated with the description are omitted in order to specifically and clearly describe the present disclosure, and like reference numerals refer to like elements throughout the specification.

Figure 2:
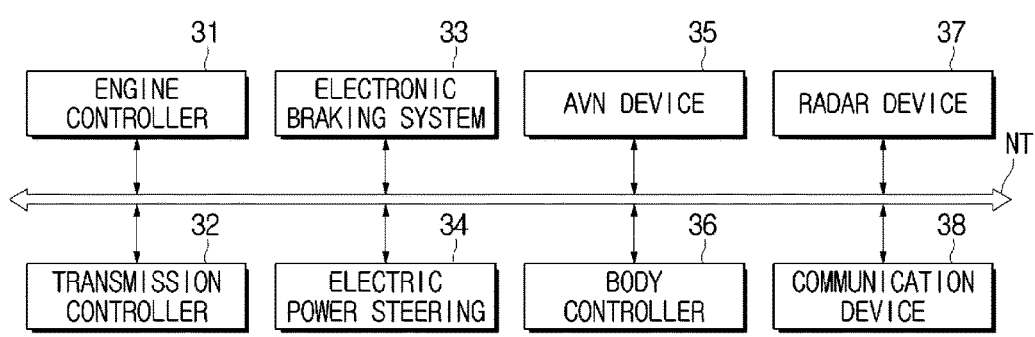
FIG. 2 is a view illustrating an electronic device of a vehicle in accordance with exemplary embodiments of the present disclosure.

FIG. 1 is a view illustrating an exterior of a vehicle in accordance with exemplary embodiments of the present disclosure and FIG. 2 is a view illustrating an electronic device of the vehicle in accordance with exemplary embodiments of the present disclosure.

As illustrated in FIG. 1, a vehicle 1 may include a body 10 forming an exterior of the vehicle 1 and accommodating a variety of components, and a vehicle wheel 20 moving the vehicle 1.

The body 10 may include a hood 11, a front fender 12, a roof panel 13, a door 14, a trunk lid 15 and a quarter panel 16 to form an inner space in which a driver is located. To provide a view to a driver, a front window 17 may be installed in the front side of the body 10 and a side window 18 may be installed in a lateral side of the body 10. Further, a rear window 19 may be installed in a rear side of the body 10.

The vehicle wheel 20 may include a front wheel 21 provided in the front side of the vehicle, and a rear wheel 22 provided in the rear side of the vehicle, wherein the vehicle 1 may move back and forth by a rotation of the vehicle wheel 20.

For the drive of the vehicle 1, a power system, a powertrain, a steering system, and a brake system may be provided in the inside of the body 10. The power system may be configured to generate a torque of the vehicle wheel 20 and include an engine, a fuel device, a cooling device, an exhaust system and an ignition system, and the power train may be configured to transmit the torque generated by the power system to the vehicle wheel 20 and include a clutch, a gear lever, a transmission a differential device and a drive shaft. The steering system may be configured to change a driving direction of the vehicle 1 and include a steering wheel, a steering gear and a steering link. In addition, the brake system may be configured to stop a driving of the vehicle 1 by stopping the rotation of the vehicle wheel 20 and include a brake pedal, a master cylinder, a brake disk, and a brake pad.

For the control of the vehicle 1 and the safety and convenience of the passenger and the driver, the vehicle 1 may include a variety of electronic control devices 30 of the vehicle 1, as well as the above mentioned mechanical devices.

For example, as illustrated in FIG. 2, the vehicle 1 may include an engine controller 31, a transmission controller 32, an electronic braking system 33, an electric power steering 34, an Audio/Video/Navigation (AVN) device 35, a body controller 36, a radar device 37 and a wireless communication device 38.

The engine controller 31 may perform a fuel injection control, an air-fuel ratio feedback control, a lean combustion control, an ignition timing control and an idling speed control.

The transmission controller 32 may perform a transmission control, a damper clutch control, a pressure control when a friction clutch is turned on/off and an engine torque control during shifting.

The electronic braking system 33 may control a braking system of the vehicle 1, and include an Anti-lock Brake System (ABS).

The electric power steering 34 may assist a driver's steering operation by reducing a steering force during driving at a low-speed or during parking, and by increasing the steering force during driving at high-speed.

In response to a user's input, the AVN device 35 may output music or an image or display a route to a destination that is input by the driver.

The body controller 36 may control an operation of the electronic control device configured to provide the convenience to the driver and to secure the safety of the driver. For example, the body controller 36 may control a power window, a door lock device, a wiper, a head lamp, an interior light, a sun roof, a power seat and a seat heating wire.

The radar device 37 may detect an obstacle or another vehicle in a front, rear and/or lateral side of the vehicle 1. The radar device 37 may be used for a forward collision avoidance function, a lane departure warning function, a blind spot detection function, and a rear detection function. For example, the radar device 37 may include a Forward Collision Warning System (FCW), an Advanced Emergency Braking System (AEBS), an Adaptive Cruise Control (ACC), a Lane Departure Warning System (LDWS), a Lane Keeping Assist System (LKAS), a Blind Spot Detection (BSD) and a Rear-end Collision Warning System (RCW).

The wireless communication device 38 may communicate with another vehicle, a user's terminal or a communication relay device through a wireless communication technology. The wireless communication device 38 may be used for a vehicle to vehicle communication (V2V communication), a vehicle to infrastructure communication (V2I communication), a vehicle to nomadic devices communication (V2N communication) and a vehicle to grid communication (V2G communication).

The wireless communication device 38 may transmit and receive a signal by using a variety of communication protocols. For example, the wireless communication device 38 may employ a 2G communication method, e. g. Time Division Multiple Access (TDMA) and Code Division Multiple Access (CDMA), a 3G communication method, e. g. Wide Code Division Multiple Access (WCDMA), a Code Division Multiple Access (CDMA) 2000, a Wireless Broadband (Wibro), a World Interoperability for Microwave Access (WiMAX) and a 4G communication method, e. g. Long Term Evolution (LTE) and Wireless Broadband Evolution. In addition, the wireless communication device 38 may employ a 5G communication method.

A variety of the electric control devices 30 included in the vehicle 1 may communicate with each other via a vehicle communication network (NT).

For example, the engine controller 31, the transmission controller 32, the electronic braking system 33, the electric power steering 34, the Audio/Video/Navigation (AVN) device 35, the body controller 36, the radar device 37 and the wireless communication device 38 may send and receive data via the vehicle communication network (NT). The vehicle communication network (NT) may employ a communication standard, e.g. Media Oriented Systems Transport (MOST) having a maximum communication speed of 24.5 (Mega-bits per second) Mbps, FlexRay having a maximum communication speed of 10 Mbps, Controller Area Network (CAN) having a communication speed of 125 (kilo-bits per second) kbps to 1 Mbps, and Local Interconnect Network (LIN) having a communication speed of 20 kbps. The vehicle communication network (NT) may employ a single communication standard, e.g. MOST, FlexRay, CAN and LIN, but also may employ a plurality of communication standards.

The above mentioned electric control device 30 may be an example of electronics installed in the vehicle 1. In the vehicle 1, an electronic device that is different from the above mentioned electric control device 30 may be installed, an additional electronic device may be installed other than the above mentioned electric control device 30 and a part of the above mentioned electric control device 30 may be omitted.

Hereinafter, the above mentioned radar device 37 and the wireless communication device 38 will be described in detail.

Figure 3:
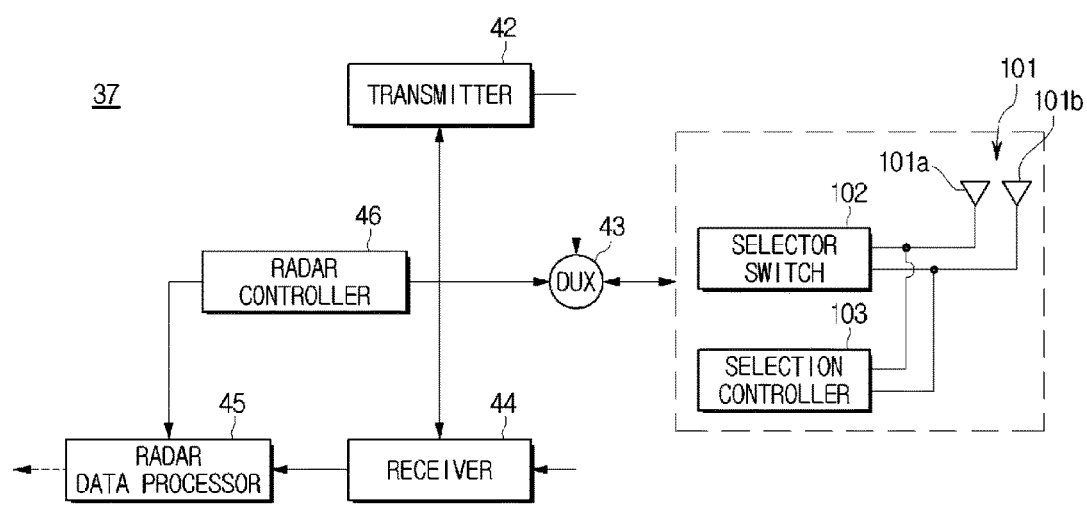
FIG. 3 is a view illustrating an example of a radar device included in a vehicle in accordance with exemplary embodiments of the present disclosure.

FIG. 3 is a view illustrating an example of a radar device included in a vehicle in accordance with exemplary embodiments of the present disclosure.

As illustrated in FIG. 3, the radar device 37 may include a transmitter 42, a duplexer 43, a receiver 44, a radar data processor 45, a radar controller 46 and an antenna 100.

The transmitter 42 may generate a radio frequency transmission signal using a radio frequency (RF) signal of a local oscillator.

The duplexer 43 may provide the radio frequency transmission signal received from the transmitter 42 to the antenna 100, or a reflection signal of the radio frequency received from the antenna 100 to the receiver 44.

The receiver 44 may extract radar data from the reflection signal received from the duplexer 43 using the radio frequency (RF) signal of the local oscillator.

The radar data processor 45 may extract location information of an object by processing the radar data received from the receiver 44.

The radar controller 46 may control an operation of the transmitter 42, the duplexer 43, the receiver 44, the radar data processor 45 and the antenna 100.

The antenna 100 may radiate the radar signal received from the duplexer 43 to a free space and then provide a reflection signal received from the free space to the duplexer 43.

The antenna 100 may include an antenna structure 101, a selector switch 102, and a selection controller 103.

The antenna structure 101 may include a first antenna 101a and a second antenna 101b, wherein the first antenna 101a and the second antenna 101b may have a different radial pattern. For example, the first antenna 101a may have a first radial pattern radiating a radio signal in a narrow radiation angle, and the second antenna 101b may have a second radial pattern radiating a radio signal in a wide radiation angle.

The selector switch 102 may provide a frequency transmission signal to any one of the first antenna 101a and the second antenna 101b according to an antenna selection signal of the selection controller 103, or receive a radio frequency reception signal from any one of the first antenna 101a and the second antenna 101b. The selector switch 102 may include at least one high frequency transistor.

The selection controller 103 may select any one of the first antenna 101a and the second antenna 101b according to a control signal of the radar controller 46, and then provide an antenna selection signal to activate the selected antenna, i.e. the first antenna 101a or the second antenna 101b, to the selector switch 102. Further, the selection controller 103 may select any one of the first antenna 101a and the second antenna 101b according to a signal strength received via the first antenna 101a and the second antenna 101b.

The selector switch 102 and the selection controller 103 may be implemented by an additional processor or a single processor integrated with the transmitter 42, the duplexer 43, the receiver 44, the radar data processor 45 and/or the radar controller 46.

As mentioned above, the radar device 37 may radiate the radio frequency transmission signal to the free space via the antenna 100, and estimate location information of the object by acquiring a reflection signal reflected from the object via the antenna 100.

Figure 4:
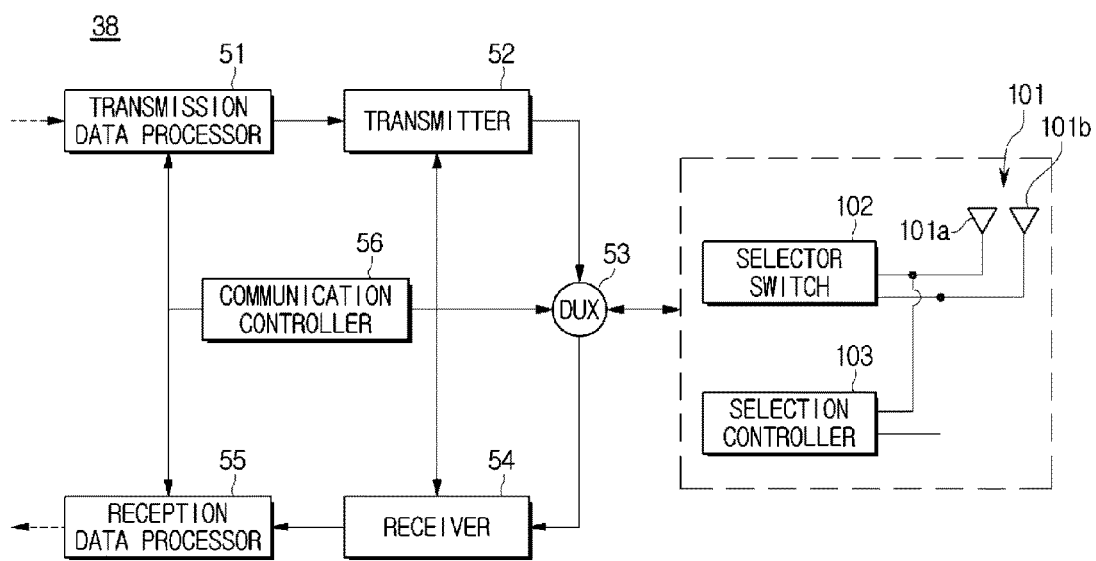
FIG. 4 is a view illustrating an example of a wireless communication device included in a vehicle in accordance with exemplary embodiments of the present disclosure.

FIG. 4 is a view illustrating an example of a wireless communication device included in a vehicle in accordance with exemplary embodiments of the present disclosure.

As illustrated in FIG. 4, the wireless communication device 38 may include a transmission data processor 51, a transmitter 52, a duplexer 53, a receiver 54, a reception data processor 55, a communication controller 56 and an antenna 100.

The transmission data processor 51 may convert digital transmission data received from another electronic device into a low frequency transmission signal, and provide the low frequency transmission signal to the transmitter 52.

The transmitter 52 may modulate the low frequency transmission signal into a radio frequency transmission signal using a radio frequency (RF) signal of a local oscillator.

The duplexer 53 may provide the radio frequency transmission signal received from the transmitter 52 to the antenna 100, or a radio frequency reception signal received from the antenna 100 to the receiver 54.

The receiver 54 may demodulate the radio frequency reception signal received from the duplexer 53 using the radio frequency (RF) signal of the local oscillator.

The reception data processor 55 may convert a low frequency reception signal received from the receiver 54 into digital reception data.

The communication controller 56 may control an operation of the transmission data processor 51, the transmitter 52, the duplexer 53, the receiver 54, the reception data processor 55 and the antenna 100.

The antenna 100 may radiate the radar signal received from the duplexer 53 to a free space and then provide a reflection signal received from the free space to the duplexer 53.

The antenna 100 may include an antenna structure 101, a selector switch 102 and a selection controller 103.

The configuration and the function of the antenna 100 is similar to those of the antenna 100 described in FIG. 3, and thus a detailed description thereof is replaced by the description of the antenna 100 of FIG. 3.

As mentioned above, the wireless communication device 38 may transmit the radio frequency transmission signal to an external device via the antenna 100, and receive the radio frequency reception signal from the external device via the antenna 100.

The radar device 37 and the wireless communication device 38 may include the antenna 100 in common and the configuration and function of the antenna 100 of the radar device 37 and the antenna 100 of the wireless communication device 38 may be substantially identical to each other.

The performance of the radar device 37 and the wireless communication device 38 may be determined by the property of the antenna 100. For example, when using millimeter waves in which a frequency is 30-300 GHz (Giga Hertz) and a wavelength is 10-1 mm, the performance of the radar device 37 and the wireless communication device 38 may substantially depend on the properties of the antenna 100.

Further, an array antenna may be used for improving the performance of the antenna 100.

Hereinafter an antenna included in a vehicle according to exemplary embodiments of the present disclosure will be described.

Figure 5:
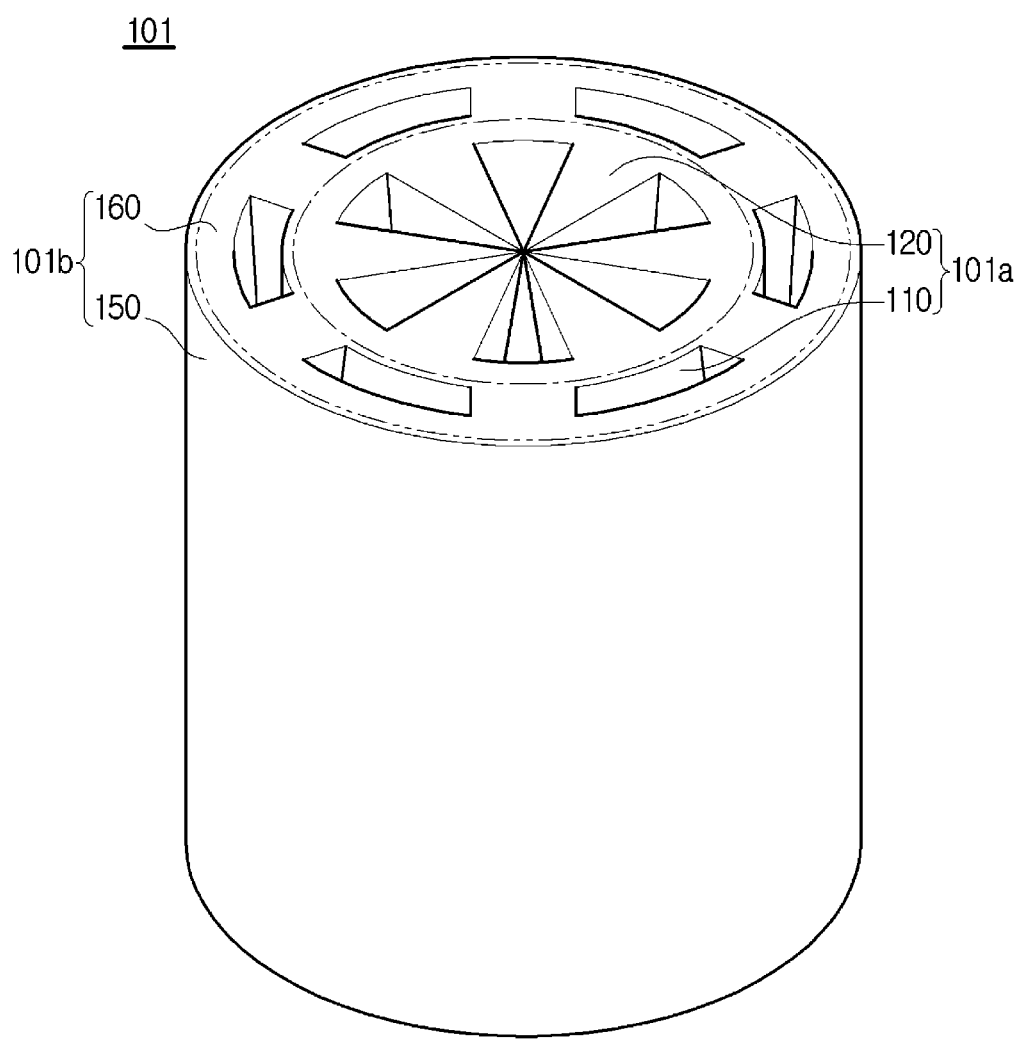
FIG. 5 is a view illustrating an antenna structure in accordance with exemplary embodiments of the present disclosure.

FIG. 5 is a view illustrating an antenna structure in accordance with exemplary embodiments of the present disclosure.

As illustrated in FIG. 5, the antenna structure 101 may include the first antenna 101a and the second antenna 101b.

The first antenna 101a may include a first antenna body 110 having a cylindrical shape with a hollow, i.e., a hollow cylindrical shape, and a second antenna body 150 having a hollow cylindrical shape.

The first antenna body 110 may be disposed inside of the second antenna body 150. As a result, the first antenna body 110 may have a cylindrical space inside thereof, and a hollow cylindrical space may be formed between the first antenna body 110 and the second antenna body 150.

A radio wave may be transmitted via the cylindrical space inside of the first antenna body 110. Further, the radio wave may be transmitted via the hollow cylindrical space between the first antenna body 110 and the second antenna body 150.

A first radiation surface 120 in a circular shape may be formed in an upper side of the first antenna body 110 to radiate a radio wave to a free space, and a second radiation surface 160 in a ring shape may be formed in an upper side of the second antenna body 150 to radiate a radio wave to the free space.

A plurality of apertures may be formed on the first radiation surface 120 and the second radiation surface 160 respectively, and a detailed description will be described later. A radio wave output from the first antenna 101a may be radiated via the aperture of the first radiation surface 120 and a radio wave output from the second antenna 101b may be radiated via the aperture of the second radiation surface 160.

Hereinafter a detailed description of the first antenna 101a and the second antenna 101b will be described below.

Figure 6:
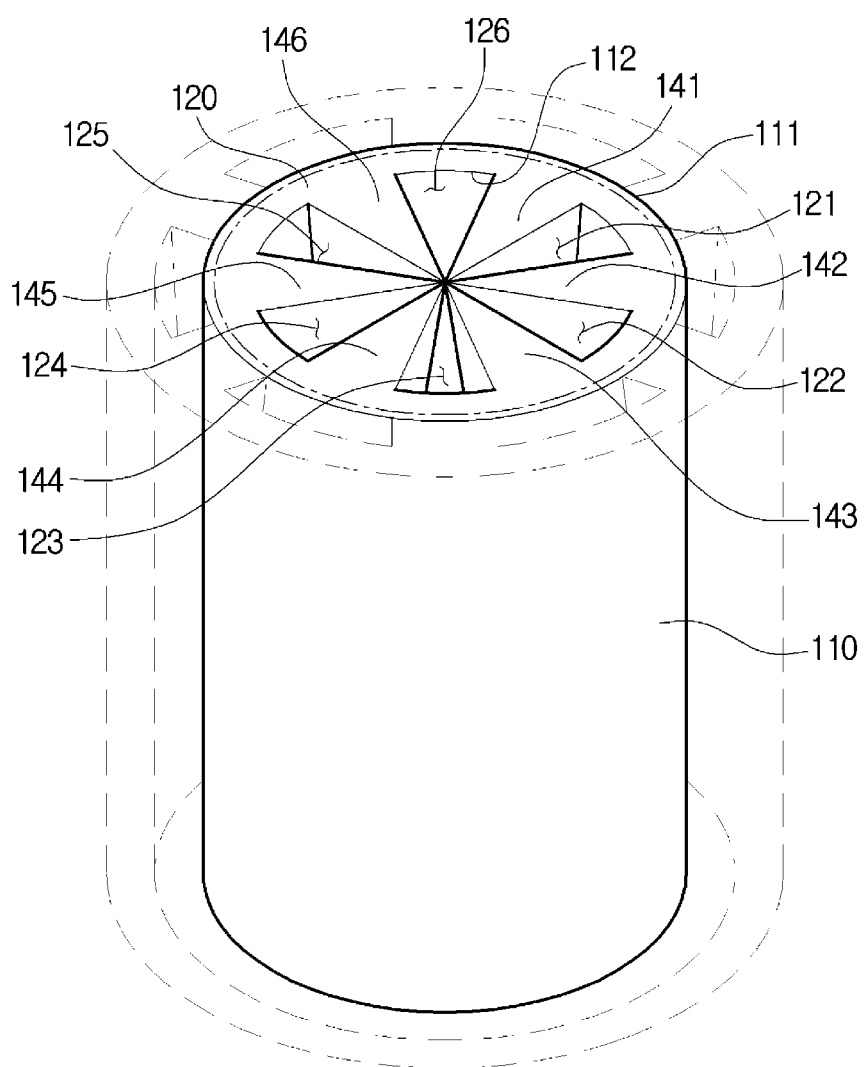
FIG. 6 is a view illustrating a first antenna of the antenna structure shown in FIG. 5.
Figure 7:
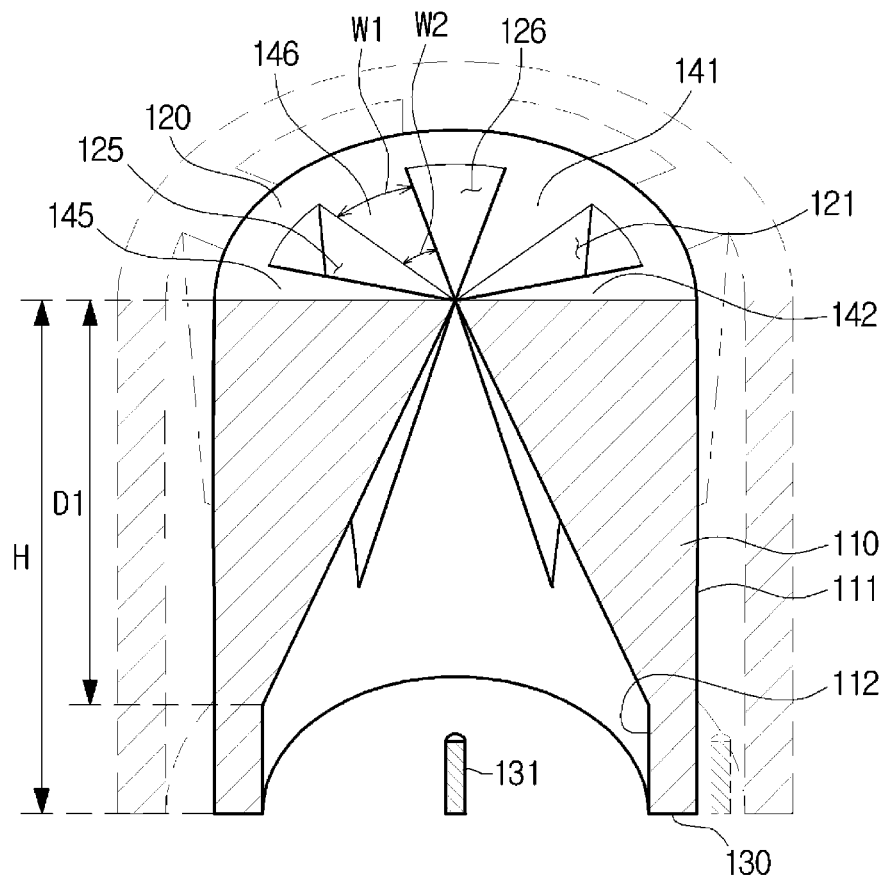
FIG. 7 is a vertical cross-sectional view illustrating the antenna structure shown in FIG. 5.

FIG. 6 is a view illustrating a first antenna of the antenna structure shown in FIG. 5. FIG. 7 is a vertical cross-sectional view illustrating the antenna structure shown in FIG. 5. Further, FIG. 8 is a view illustrating a first partition included in the antenna structure shown in FIG. 5.

Referring to FIGS. 6 to 8, the first antenna 101a may include the first antenna body 110 formed in a hollow cylindrical shape.

The first radiation surface 120 and a first feeding surface 130 may be formed in an upper side and a lower side of the first antenna body 110, respectively. The first radiation surface 120 and the first feeding surface 130 may be formed in a circular shape, and the first radiation surface 120 and the first feeding surface 130 may have the same shape.

On the outside of the first antenna body 110, a first outer surface 111 may be formed along a circumference of the first radiation surface 120 and the first feeding surface 130. The first outer surface 111 may be provided between the first radiation surface 120 and the first feeding surface 130 wherein a direction to which the first outer surface 111 is directed is perpendicular to a direction to which the first radiation surface 120 and the first feeding surface 130 are directed.

In the inside of the first antenna body 110, a hollow, or hollow area, passing through the first antenna body 110 may be formed in a direction perpendicular to the first radiation surface 120 and the first feeding surface 130. The hollow may have a cylindrical shape and a central axis of the hollow may be identical to a central axis (C) of the first antenna body 110.

Further, a first inner surface 112 facing the hollow may be formed in the inside of the first antenna body 110. The first inner surface 112 may be provided between the first radiation surface 120 and the first feeding surface 130 wherein a direction to which the first inner surface 112 is directed is perpendicular to a direction to which the first radiation surface 120 and the first feeding surface 130 are directed.

As a result, the first antenna body 110 may have a hollow cylindrical shape having the first outer surface 111 and the first inner surface 112 together with opposite bottom surfaces, i.e., the radiation surface and the feeding surface.

The first antenna body 110 may be formed of electrically conductive material.

In the inside of the first antenna body 110, a plurality of first partitions 141, 142, 143, 144, 145 and 146 may be provided.

As illustrated in FIG. 7, the plurality of the first partitions 141-146 may be protruded from the first inner surface 112 of the first antenna body 110 to the central axis (C) of the first antenna body 110. Due to the plurality of the first partitions 141-146, a part of the first radiation surface 120 of the first antenna body 110 may be closed, and a plurality of first radiation apertures 121, 122, 123, 124, 125 and 126 may be formed between the plurality of the first partitions 141-146. A detailed description of the plurality of the first radiation apertures 121-126 will be described below.

According to the drawings, the plurality of the first partitions 141-146 may be provided to be apart from each other by the same distance along the first inner surface 112 of the first antenna body 110, but the arrangement of the plurality of the first partitions 141-146 is not limited thereto. For example, the plurality of the first partitions 141-146 may be irregularly arranged along the first inner surface 112 of the first antenna body 110. Further, FIG. 6 illustrates that six first partitions 141-146 are described, but the number of the first partitions is not limited thereto. Thus, the number of the first partitions may be less than or more than six.

The plurality of the first partitions 141-146 may make contact with each other around the central axis (C) of the first antenna body 110. As a result, an inner space of the first antenna body 110 may be divided by the plurality of the first partitions 141-146. Particularly, the plurality of the first radiation apertures 121-126 formed by the plurality of the first partitions 141-146 may be not communicated with each other.

A width (W1 and W2) of the plurality of the first partitions 141-146 may vary inversely with a distance from the first inner surface 112 of the first antenna body 110 and closer to the central axis (C) of the first antenna body 110. Particularly, the width (W1) of the plurality of the first partitions 141-146 adjacent to the first inner surface 112 of the first antenna body 110 may be larger than the width (W2) of the plurality of the first partitions 141-146 adjacent to the central axis (C) of the first antenna body 110.

As a result, a horizontal cross section of the plurality of the first partitions 141-146, i.e. a cross section perpendicular to the central axis (C) of the first antenna body 110, may have a sector shape. Particularly, the horizontal cross section of the plurality of the first partitions 141-146 in the first radiation surface 120 of the first antenna body 110 may have a sector shape in which the central axis (C) of the first antenna body 110 corresponds to a vertex.

In addition, the plurality of the first partitions 141-146 may be downwardly extended from the first radiation surface 120 of the first antenna body 110 to the first feeding surface 130.

A distance (D1) in which the plurality of the first partitions 141-146 is extended from the first radiation surface 120 to the first feeding surface 130 may be less than a height (H) of the first antenna body 110. In other words, the plurality of the first partitions 141-146 may be extended from the first radiation surface 120 of the first antenna body 110 to an appropriate height or to the first feeding surface 130.

Figure 8A:
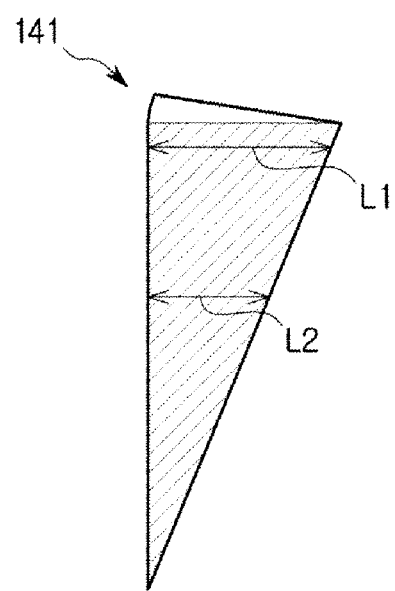
FIGS. 8a and 8b are views illustrating a first partition included in the antenna structure shown in FIG. 5.

In addition, a length (L1 and L2) in which the plurality of the first partitions 141-146 is protruded from the first inner surface 112 of the first antenna body 110 to the central axis (C) may vary inversely with a distance from the first radiation surface 120. Particularly, as illustrated in FIG. 8A, the length (L1) in which the plurality of the first partitions 141-146 adjacent to the first radiation surface 120 of the first antenna body 110 is extended to the central axis (C) may be larger than the length (L2) in which the plurality of the first partitions 141-146 adjacent to the first feeding surface 130 of the first antenna body 110 is extended to the central axis (C).

As a result, a vertical cross section of the plurality of the first partitions 141-146, i.e., a cross section parallel with the central axis (C) of the first antenna body 110 may have a right triangle shape.

Figure 8B:
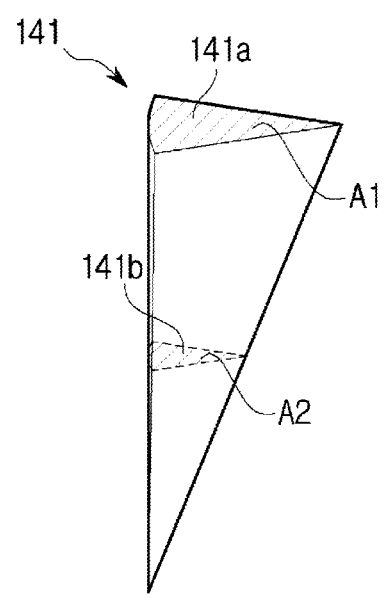

In addition, a horizontal cross section of the plurality of the first partitions 141-146, that is an area of cross section perpendicular to the central axis (C) of the first antenna body 110, may vary inversely with a distance from the first radiation surface 120. Particularly, as illustrated in FIG. 8B, an area (A1) of a horizontal cross section 141*a* of the plurality of the first partitions 141-146 in the first radiation surface 120 of the first antenna body 110 may be larger than an area (A2) of a horizontal cross section 141*b* of the plurality of the first partitions 141-146 in the center of the first antenna body 110.

As a result, the plurality of the first partitions 141-146 may have a polygonal pyramid shape in which a bottom has a sector shape. In addition, a vertical cross section of the sector-shaped cone forming the plurality of the first partitions 141-146 may be a right triangle.

Since the plurality of the first partitions 141-146 has the polygonal pyramid shape in which a bottom has a sector shape, a radio wave inside of the first antenna 101*a* may be smoothly divided along a side wall of the plurality of the first partitions 141-146, and then radiated to the free space via the plurality of the first radiation apertures 121-126 formed between the plurality of the first partitions 141-146.

The plurality of the first partitions 141-146 may be formed of electrically conductive material.

Figure 9:
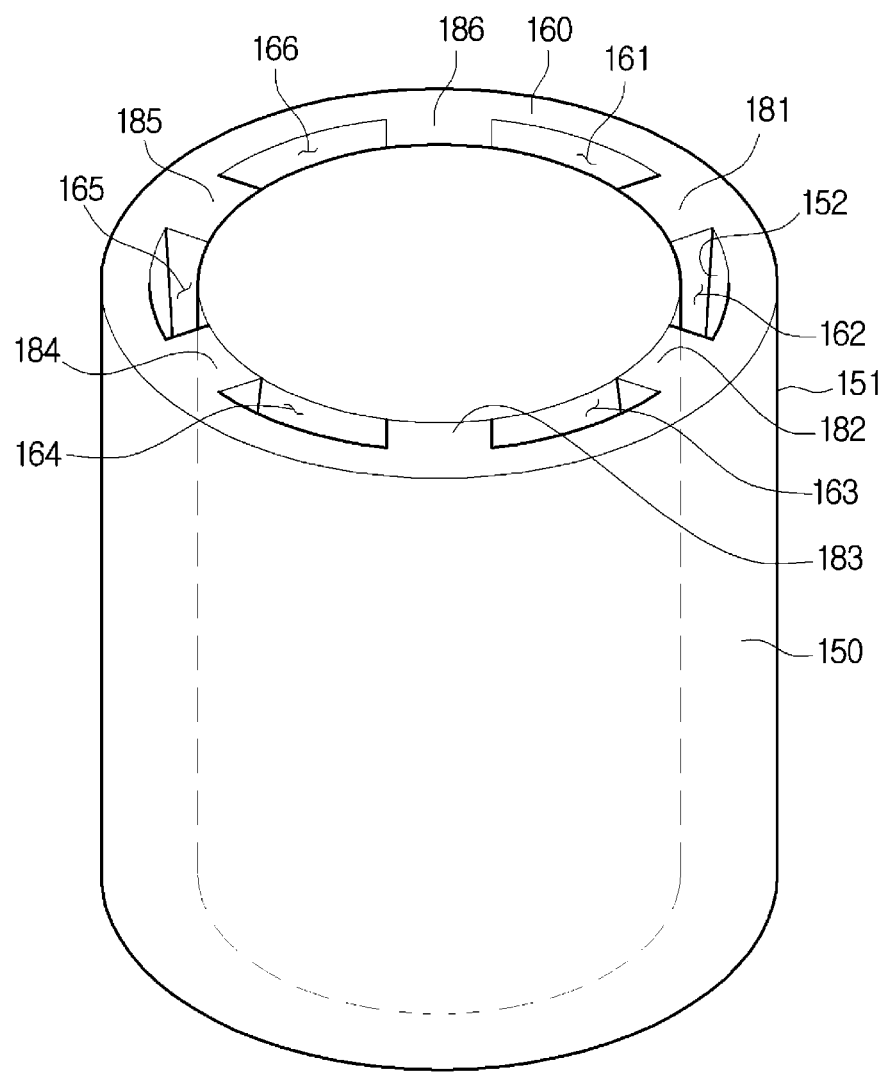
FIG. 9 is a view illustrating a second antenna of the antenna structure shown in FIG. 5.
Figure 10:
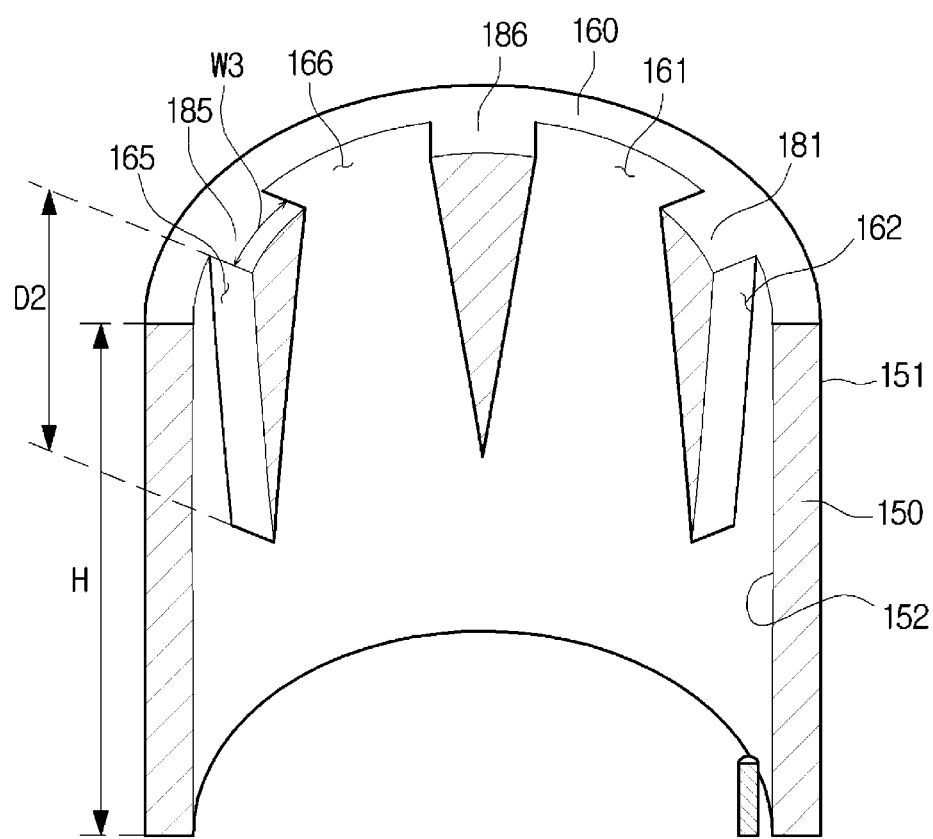
FIG. 10 is a vertical cross-sectional view illustrating the antenna structure shown in FIG. 5 in which the first antenna is omitted.

FIG. 9 is a view illustrating a second antenna of the antenna structure shown in FIG. 5. FIG. 10 is a vertical cross-sectional view illustrating the antenna structure shown in FIG. 5 in which the first antenna is omitted. In addition, FIG. 11 is a view illustrating a second partition included in the antenna structure shown in FIG. 5.

Referring to FIGS. 9 to 11, the second antenna 101*b* may include the second antenna body 150 formed in a hollow cylindrical shape, wherein the above mentioned the first antenna body 110 of the first antenna 101*a* may be disposed in the hollow of the second antenna 101*b*.

The second radiation surface 160 and a second feeding surface 170 may be formed in an upper side and a lower side of the second antenna body 150, respectively. The second radiation surface 160 and the second feeding surface 170 may be formed in a ring shape, and the second radiation surface 160 and the second feeding surface 170 may have the same shape.

On the outside of the second antenna body 150, a second outer surface 151 may be formed along a circumference of the second radiation surface 160 and the second feeding surface 170. The second outer surface 151 may be provided between the second radiation surface 160 and the second feeding surface 170 wherein a direction to which the second outer surface 151 is directed is perpendicular to a direction to which the second radiation surface 160 and the second feeding surface 170 are directed.

In the inside of the second antenna body 150, a hollow, or a hollow area, passing through the second antenna body 150 may be formed in a direction perpendicular to the second radiation surface 160 and the second feeding surface 170. The hollow may have a cylindrical shape and a central axis of the hollow may be identical to a central axis (C) of the second antenna body 150.

Further, a second inner surface 152 facing the hollow may be formed in the inside of the second antenna body 150. The second inner surface 152 may be provided between the second radiation surface 160 and the second feeding surface 170 wherein a direction to which the second inner surface 152 is directed is perpendicular to a direction to which the second radiation surface 160 and the second feeding surface 170 are directed.

Therefore, the second antenna body 150 may have a hollow cylindrical shape having the second outer surface 151 and the second inner surface 152 together with opposite bottom surfaces, i.e., the radiation surface and the feeding surface.

The second antenna body 150 may be formed of electrically conductive material.

In the inside of the second antenna body 150, a plurality of second partitions 181, 182, 183, 184, 185 and 186 may be provided.

As illustrated in FIG. 10, the plurality of the second partitions 181-186 may be protruded from the second inner surface 152 of the second antenna body 150 to the first antenna body 110. Due to the plurality of the second partitions 181-186, a part of the second radiation surface 160 of the second antenna body 150 may be closed, and a plurality of second radiation apertures 161, 162, 163, 164, 165 and 166 may be formed between the plurality of the second partitions 181-186. A detailed description of the plurality of the second radiation apertures 161-166 will be described below.

According to the drawings, the plurality of the second partitions 181-186 may be provided to be apart from each other by the same distance along the second inner surface 152 of the second antenna body 150, but the arrangement of the plurality of the second partitions 181-186 is not limited thereto. For example, the plurality of the second partitions 181-186 may be irregularly arranged along the second inner surface 152 of the second antenna body 150. Further, in the drawings, six second partitions 181-186 are described, but the number of the second partitions is not limited thereto. Thus, the number of the second partitions may be less than or more than six.

The plurality of the second partitions 181-186 may make contact with the first antenna body 110. In other words, the plurality of the second partitions 181-186 may be extended from the second inner surface 152 of the second antenna body 150 to the first outer surface 111 of the first antenna body 110. As a result, a space between the first antenna body 110 and the second antenna body 150 may be divided by the plurality of the second partitions 181-186. Particularly, the plurality of the second radiation apertures 161-166 formed by the plurality of the second partitions 181-186 may be not communicated with each other.

A width (W3) of the plurality of the second partitions 181-186 may be constant regardless of a distance from the second inner surface 152 of the second antenna body 150. In other words, the width (W3) of the plurality of the second partitions 181-186 adjacent to the second inner surface 152 of the second antenna body 150 may be the same as the width (W3) of the plurality of the second partitions 181-186 adjacent to the first outer surface 111 of the first antenna body 110. As a result, a horizontal cross section of the plurality of the second partitions 181-186, i.e. a cross section perpendicular to the central axis (C) of the second antenna body 150, may have a polygon shape formed by two straight lines facing and being parallel to each other, and two arcs parallel to each other.

However, the width (W3) of the plurality of the second partitions 181-186 is not limited thereto, and thus the width (W3) of the plurality of the second partitions 181-186 may vary according to a distance from the second inner surface 152 of the second antenna body 150. For example, the width (W3) of the plurality of the second partitions 181-186 may vary inversely or directly with a distance from the second inner surface 152 of the second antenna body 150.

The plurality of the second partitions 181-186 may be extended from the second radiation surface 160 of the second antenna body 150 to the second feeding surface 170. In this time, a distance (D2) in which the plurality of the second partitions 181-186 is extended from the second radiation surface 160 to the second feeding surface 170 may be less than a height (H) of the second antenna body 150. In other words, the plurality of the second partitions 181-186 may be extended from the second radiation surface 160 of the second antenna body 150 to a certain height or to the second feeding surface 170.

Figure 11A:
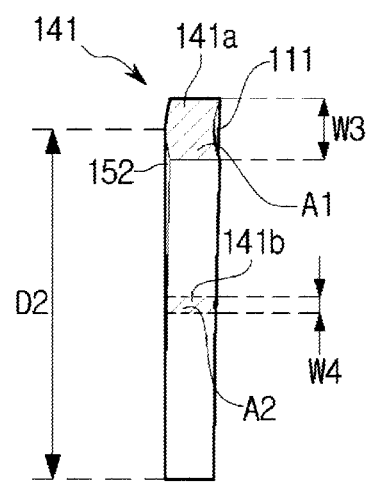
FIGS. 11a and 11b are views illustrating a second partition included in the antenna structure shown in FIG. 5.
Figure 11B:
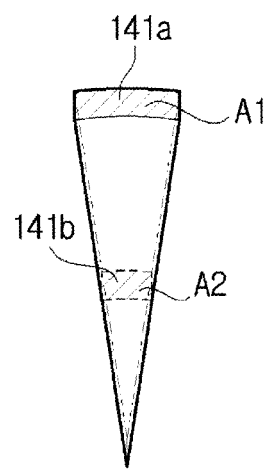

A width (W3 and W4) of the plurality of the second partitions 181-186 may vary inversely with a distance from the second radiation surface 160 of the second antenna body 150. Particularly, as illustrated in FIGS. 11A and 11B, the width (W3) of the plurality of the second partitions 181-186 adjacent to the second radiation surface 160 of the second antenna body 150 may be larger than the width (W4) of the plurality of the second partitions 181-186 adjacent to a middle height of the second antenna body 150. As a result, the plurality of the second partitions 181-186 may have a triangle shape when viewed from the central axis (C) of the second antenna body 150.

In addition, a horizontal cross section of the plurality of the second partitions 181-186, that is an area of cross section perpendicular to the central axis (C) of the second antenna body 150 may vary inversely with a distance from the second radiation surface 160. Particularly, as illustrated in FIGS. 11A and 11B, an area (A1) of a horizontal cross section 181a of the plurality of the second partitions 181-186 in the second radiation surface 160 of the second antenna body 150 may be larger than an area (A2) of a horizontal cross section 181b of the plurality of the second partitions 181-186 in the middle of the second antenna body 150.

As mentioned above, since the width (W3 and W4) of the plurality of the second partitions 181-186 vary inversely with a distance from the second radiation surface 160, a radio wave inside of the second antenna body 150 may be smoothly divided along a side wall of the plurality of the second partitions 181-186, and then radiated to the free space via the plurality of the second radiation apertures 161-166 formed between the plurality of the second partitions 181-186.

However, the width (W3 and W4) of the plurality of the second partitions 181-186 is not limited thereto, and thus the width (W3 and W4) of the plurality of the second partitions 181-186 may be constant regardless of a distance from the second radiation surface 160 of the second antenna body 150 or may be increased as being farther from the second radiation surface 160 of the second antenna body 150.

The plurality of the second partitions 181-186 may be formed of electrically conductive material, in the same manner as the second antenna body 150.

The above mentioned first antenna body 110, plurality of first partitions 141-146, second antenna body 150, and plurality of second partitions 181-186 may be integrally formed with each other. For example, the first antenna body 110, the plurality of the first partitions 141-146, the second antenna body 150, and the plurality of the second partitions 181-186 may be integrally manufactured with each other by using a 3D printer or by depositing a plurality of metal plates.

Alternatively, the first antenna body 110, the plurality of the first partitions 141-146, the second antenna body 150, and the plurality of the second partitions 181-186 may be individually manufactured and then assembled with each other.

Figure 12:
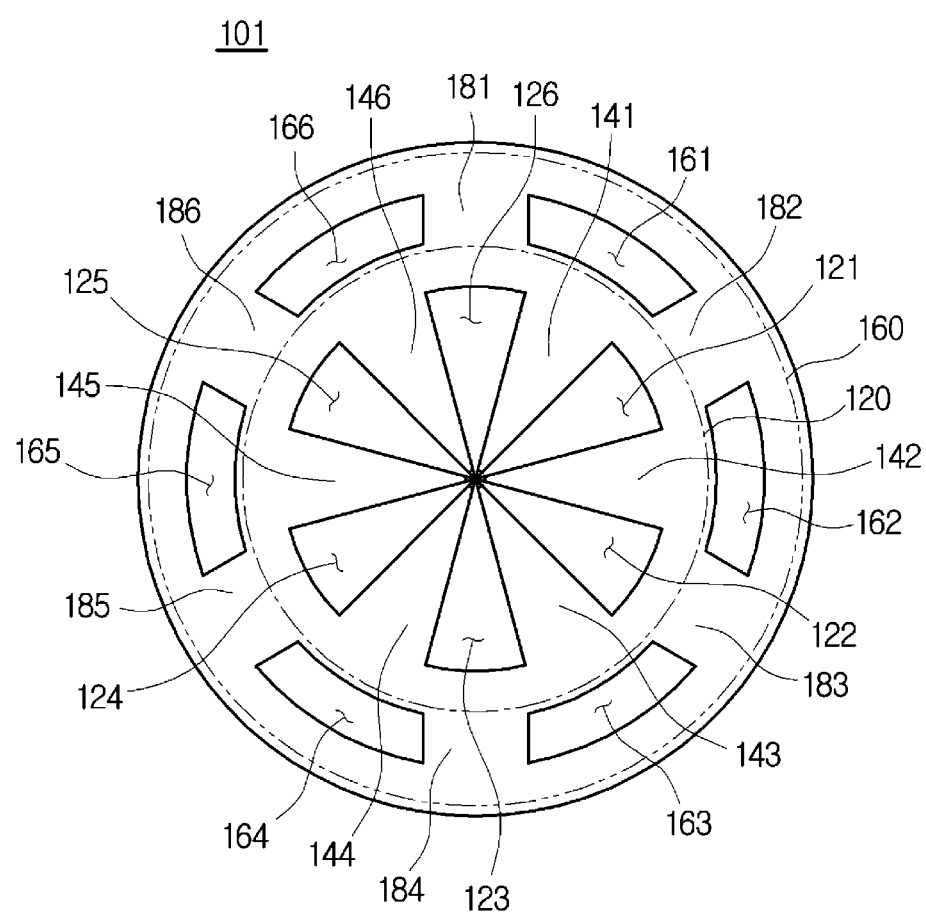
FIG. 12 is a view illustrating a radiation aperture of the antenna structure shown in FIG. 5.

FIG. 12 is a view illustrating the radiation aperture of the antenna structure shown in FIG. 5.

As illustrated in FIG. 12, the first radiation surface 120 may be divided into the plurality of the first radiation apertures 121-126 by the plurality of the first partitions 141-146, and the second radiation surface 160 may be divided into the plurality of the second radiation apertures 161-166 by the plurality of the second partitions 181-186.

The number of the first and second radiation apertures 121-126 and 161-166 may be determined by the number of first and second partitions 141-146 and 181-186. For example, when the antenna structure 101 includes six first partitions 141-146 and six second partitions 181-186, six first radiation apertures 121-126 and six second radiation apertures 161-166 may be formed. However, the numbers of the first partition and second partition and the numbers of the first radiation aperture and second radiation aperture is not limited to six. Thus, the antenna structure 101 may include less than or more than six first and second partitions, and less than or more than six first and second radiation apertures may be formed.

An area of the first and second radiation apertures 121-126 and 161-166 may be determined by an area occupied by the first and second partitions 141-146 and 181-186. Particularly, the area of the first and second radiation apertures 121-126 and 161-166 may be reduced as the area occupied by the first and second partitions 141-146 and 181-186 is further increased, and the area of the first and second radiation apertures 121-126 and 161-166 may be increased as the area occupied by the first and second partitions 141-146 and 181-186 is further reduced.

Each of first radiation apertures 121-126 may have a sector shape in which a central axis (C1) of the first radiation surface 120 corresponds to a vertex, and each of second radiation apertures 161-166 may have a polygon shape formed by two straight lines facing and being parallel to each other, and two arcs parallel to each other.

When the plurality of the first and second partitions 141-146 and 181-186 are apart from each other by the same distance, each of the area of the first radiation apertures 121-126 may be the same as each other and each of the area of the second radiation apertures 161-166 may be the same as each other. Alternatively, when the plurality of the first and second partitions 141-146 and 181-186 is irregularly disposed, each of the areas of the first radiation apertures 121-126 may be different from each other and each of the areas of the second radiation apertures 161-166 may be different from each other.

Further, a diameter of the first and second radiation surface 120 and 160, a height of the first and second antenna body 110 and 150, and an area of the first and second radiation apertures 121-126 and 161-166 may vary according to a frequency of a radio wave intended to be radiated through the antenna structure 101.

A first feeding pin 131 configured to supply power to the first antenna 101a may be provided on the first feeding surface 130 of the first antenna body 110, and a second feeding pin 171 configured to supply power to the second antenna 101b may be provided on the second feeding surface 170 of the second antenna body 150. At this time, the first and second feeding pin 131 and 171 may be a signal line of a cable (not shown) configured to output a signal to the first and second antenna 101a and 101b.

The first feeding pin 131 may be provided on a center (C2) of the first feeding surface 130, but a position of the first feeding pin 131 is not limited to the center (C2) of the first feeding surface 130. Thus, the first feeding pin 131 may be disposed on any position of the first feeding surface 130. In addition, the second feeding pin 171 may be provided on one side of the second feeding surface 170.

The first and second feeding pins 131 and 171 may receive a high frequency signal, which is intended to be radiated through the first antenna 101a and the second antenna 101b, from the cable, and radiate the received high frequency signal to the inside of the first antenna 101a and the second antenna 101b, in the form of radio waves. In other words, a high frequency radio wave may be generated in the inside of the first antenna 101a and the second antenna 101b by the high frequency signal transmitted to the first and second feeding pins 131 and 171.

In addition, the high frequency radio wave generated in the inside of the first antenna 101a and the second antenna 101b may be divided by the plurality of the first and second partitions 141-146 and 181-186, and then radiated via of the first and second radiation apertures 121-126 and 161-166. In this time, a distance, in which each of the radio waves radiated via the first and second radiation apertures 121-126 and 161-166 is radiated in the inside of the first antenna 101a and the second antenna 101b, may be the same as each other. Therefore, a phase and amplitude of the radio wave radiated through the first and second radiation apertures 121-126 and 161-166 may be the same as each other.

As a result, the radio wave radiated from the first antenna 101a and the second antenna 101b may have the directivity.

Figure 13:
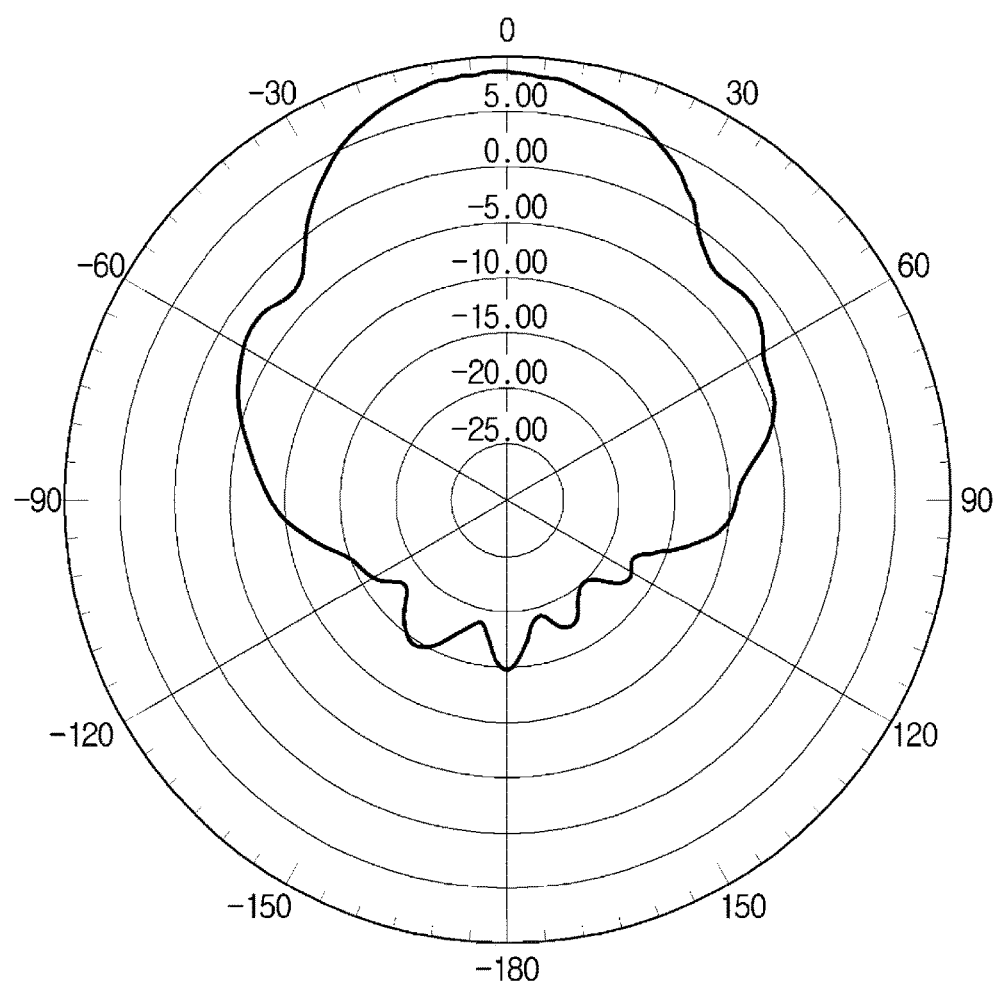
FIG. 13 is a view illustrating a radial pattern of a radio wave radiated from the first antenna of the antenna structure shown in FIG. 5.

FIG. 13 is a view illustrating a radial pattern of a radio wave radiated from the first antenna of the antenna structure shown in FIG. 5. Particularly, FIG. 13 illustrates the intensity of the radio wave radiated by the first antenna 101a about a direction in which the radio wave is radiated, with respect to a direction to which the central axis (C) of the antenna structure 101 is directed.

As illustrated in FIG. 13, the radio wave radiated from the first antenna 101a may be focused in a direction perpendicular to the first radiation surface 120 of the first antenna 101a. In other words, the radio wave radiated along the central axis (C) of the first antenna 101a may have the strongest electricity and the radio wave radiated from the first antenna 101a may have the directivity toward the central axis (C) of the antenna structure 101.

Figure 14:
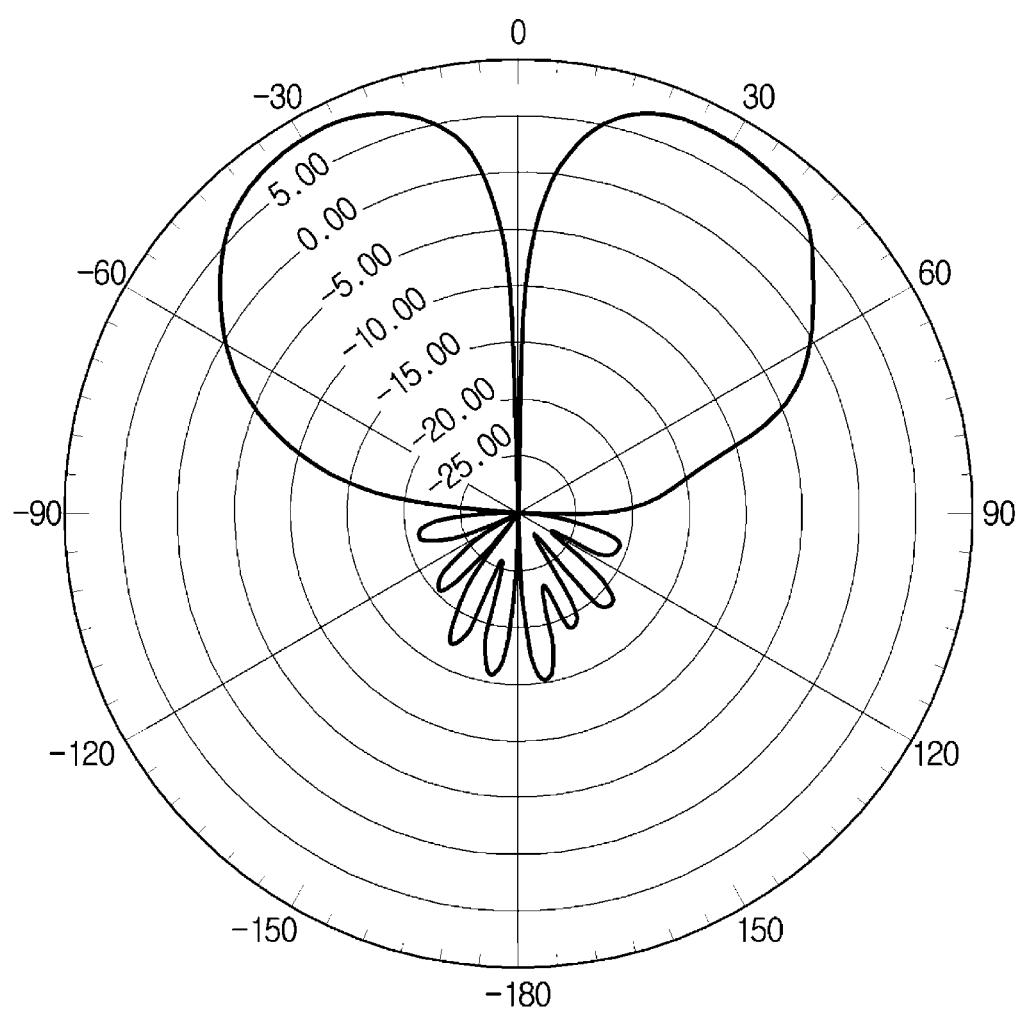
FIG. 14 is a view illustrating a radial pattern of a radio wave radiated from the second antenna of the antenna structure shown in FIG. 5.

FIG. 14 is a view illustrating a radial pattern of a radio wave radiated from the second antenna of the antenna structure shown in FIG. 5. Particularly, FIG. 14 illustrates the intensity of the radio wave radiated by the second antenna 101b about a direction in which the radio wave is radiated, with respect to a direction to which the central axis (C) of the antenna structure 101 is directed.

As illustrated in FIG. 14, the radio wave radiated from the second antenna 101b may be focused in a lateral direction of a direction perpendicular to the second radiation surface 160 of the second antenna 101b. In other words, the radio wave radiated in a direction that is deviated from the central axis (C) of the second antenna 101b with a predetermined angle may have the strongest electricity and the radio wave radiated from the second antenna 101b may have the directivity toward a direction with a predetermined angle from the central axis (C) of the second antenna 101b. "Predetermined angle" may be determined by the diameter of the second radiation surface 160 of the second antenna 101b, the diameter of the first radiation surface 120 of the first antenna 101a, the height of the second antenna body 150 and the area of the plurality of the second radiation apertures 161-166.

As mentioned above, the antenna structure 101 may include the first antenna 101a and the second antenna 101b having the hollow cylindrical shape, and the first antenna 101a and the second antenna 101b may have a different radial pattern.

The first antenna 101a may radiate a radio wave that is focused in a direction perpendicular to the first radiation surface 120, and the second antenna 101b may radiate a radio wave that is focused in a direction deviated from the direction perpendicular to the second radiation surface 160, with a predetermined angle therefrom.

Further, since the first and second feeding surface 130 and 170 have circular shapes, it may be easy for them to be connected to a coaxial cable supplying a signal. In addition, the antenna structure 101 may easily adjust an antenna gain by changing the diameter of the first and second antenna body 110 and 150 or changing the area of the first and second radiation apertures 121-126 and 161-166.

Hereinafter an antenna radiating a radio wave having directivity will be described according to exemplary embodiments of the present disclosure.

Figure 15:
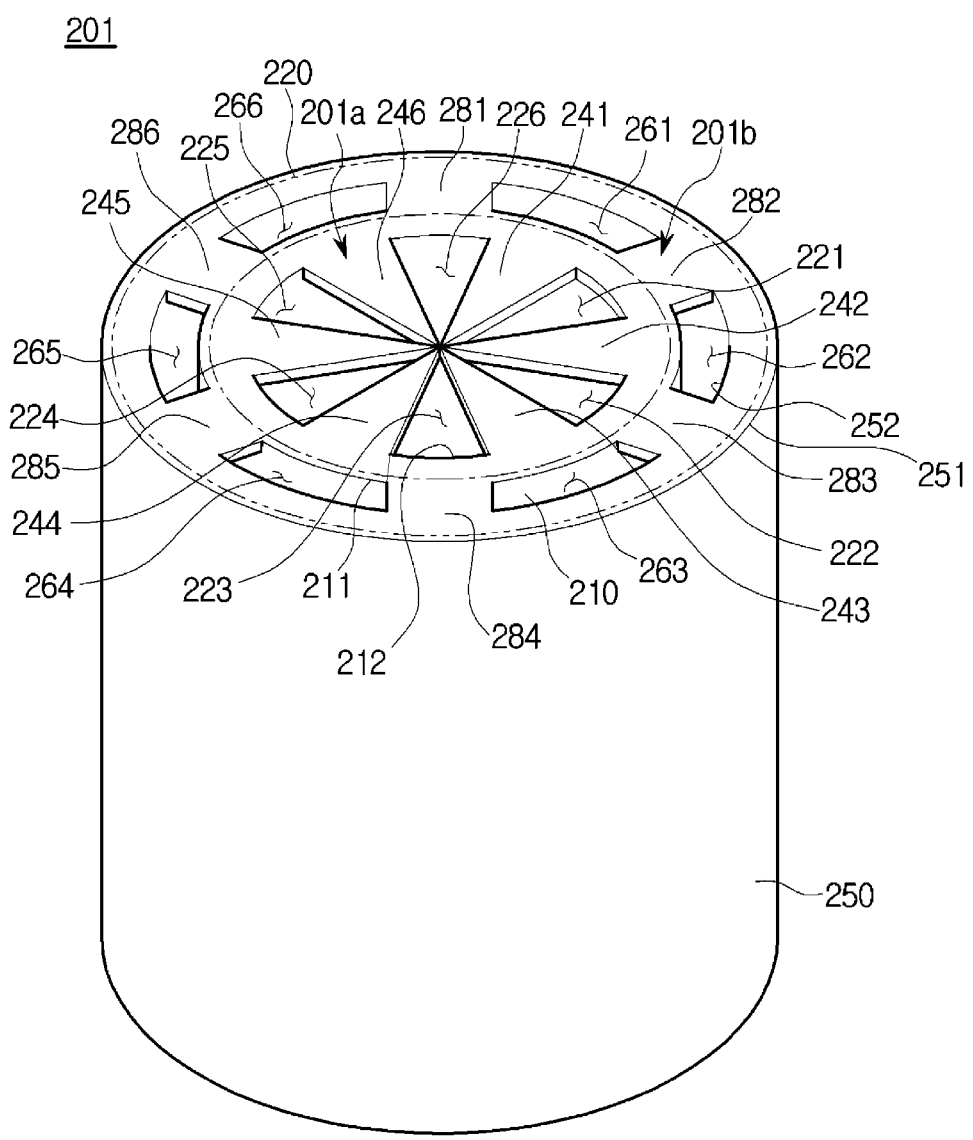
FIG. 15 is a view illustrating an antenna structure in accordance with exemplary embodiments of the present disclosure.
Figure 16:
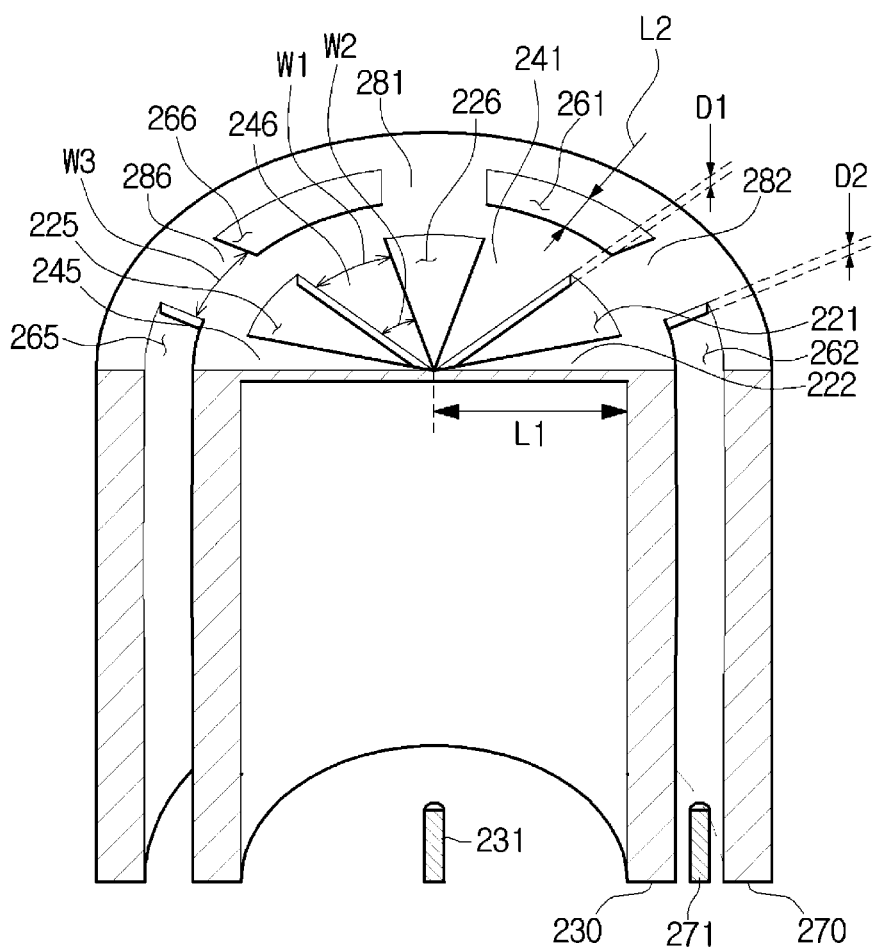
FIG. 16 is a vertical cross-sectional view illustrating the antenna structure shown in FIG. 15.

FIG. 15 is a view illustrating an antenna structure in accordance with exemplary embodiments of the present disclosure. FIG. 16 is a vertical cross-sectional view illustrating the antenna structure shown in FIG. 15.

Referring to FIGS. 15 and 16, an antenna structure 201 may include a first antenna 201a and a second antenna 201b.

The first antenna 201a may include a first antenna body 210 wherein the first antenna body 210 may include a first radiation surface 220, a first feeding surface 230, a first outer surface 211 and a first inner surface 212. Further, the second antenna 201b may include a second antenna body 250 wherein the second antenna body 250 may include a second radiation surface 260, a second feeding surface 270, a second outer surface 251 and a second inner surface 252.

The structure of the first and second antenna body 210 and 250 is the same as the structure of the first and second antenna body 110 and 150 shown in FIG. 5, and thus a detailed description thereof will be replaced by the description of a structure of the first and second antenna body 110 and 150 shown in FIG. 5.

In the inside of the first antenna body 210, a plurality of first partitions 241, 242, 243, 244, 245 and 246 may be provided.

The plurality of the first partitions 241-246 may be protruded from the first inner surface 212 of the first antenna body 210 to a central axis (C) of the first antenna body 210. Due to the plurality of the first partitions 241-246, a part of the first radiation surface 220 of the first antenna body 210 may be closed, and a plurality of first radiation apertures 221-226 may be formed between the plurality of the first partitions 241-246.

However, the arrangement and the number of the plurality of the first partitions 241-246 may be not limited to those shown in FIGS. 15 and 16.

The plurality of the first partitions 241-246 may make contact with each other around the central axis (C) of the first antenna body 210. Since the plurality of the first partitions 241-246 makes contact with each other around the central axis (C) of the first antenna body 210, the area around the center (C1) of the first radiation surface 220 may be closed.

A width (W1 and W2) of the plurality of the first partitions 241-246 may vary inversely with a distance from the first inner surface 212 of the first antenna body 210. Particularly, the width (W1) of the plurality of the first partitions 241-246 adjacent to the first inner surface 212 of the first antenna body 210 may be larger than the width (W2) of the plurality of the first partitions 241-246 adjacent to the central axis (C) of the first antenna body 210. As a result, a horizontal cross section of the plurality of the first partitions 241-246, i.e. a cross section perpendicular to the central axis (C) of the first antenna body 210, may have a sector shape in which the central axis (C) of the first antenna body 210 corresponds to a vertex.

The plurality of the first partitions 241-246 may be downwardly extended from the first radiation surface 220 of the first antenna body 210 to the first feeding surface 230. At this time, a distance in which the plurality of the first partitions 241-246 is extended from the first radiation surface 220 to the first feeding surface 230, i.e., a thickness (D1) of the plurality of the first partitions 241-246 may be less than a height (H) of the first antenna body 210. Particularly, the thickness (D1) of the plurality of the first partitions 241-246 may be sufficiently thin and in this case, the plurality of the first partitions 241-246 may have a plate shape.

A length (L1) in which the plurality of the first partitions 241-246 is protruded from the first inner surface 212 of the first antenna body 210 to the central axis (C) may be constant. As a result, a vertical cross section of the plurality of the first partitions 241-246, i.e., a cross section parallel with the central axis (C) of the first antenna body 210 may have a rectangular shape.

As mentioned above, the plurality of the first partitions 241-246 may have a polygon column shape in which a bottom thereof is a sector shape, according to the thickness (D1) of the plurality of the first partitions 241-246. When the thickness (D1) of the plurality of the first partitions 241-246 is sufficiently thin, the plurality of the first partitions 241-246 may be a sector-shaped plate.

Between the first antenna body 210 and the second antenna body 250, a plurality of second partitions 281, 282, 283, 284, 285 and 286 may be provided.

The plurality of the second partitions 281-286 may be protruded from the second inner surface 252 of the second antenna body 250 to the first outer surface 211 of the first antenna body 210. Due to the plurality of the second partitions 281-286, a part of the second radiation surface 260 of the second antenna body 250 may be closed, and a plurality of second radiation apertures 261-266 may be formed between the plurality of the second partitions 281-286.

However, the arrangement and the number of the plurality of the second partitions 281-286 may be not limited to FIGS. 15 and 16.

The plurality of the second partitions 281-286 may make contact with the first antenna body 210. As a result, the plurality of the second radiation apertures 261-266 formed by the plurality of the second partitions 281-286 may not communicate with each other.

A width (W3) of the plurality of the second partitions 281-286 may be constant regardless of a distance from the second inner surface 252 of the second antenna body 250. As a result, a horizontal cross section of the plurality of the second partitions 281-286, i.e. a cross section perpendicular to the central axis (C) of the second antenna body 250, may have a polygon shape formed by two straight lines facing and being parallel to each other, and two arcs parallel to each other.

However, the width (W3) of the plurality of the second partitions 281-286 is not limited thereto, and thus the width (W3) of the plurality of the second partitions 281-286 may vary inversely or directly with a distance from the second inner surface 252 of the second antenna body 250.

The plurality of the second partitions 281-286 may be downwardly extended from the second radiation surface 260 of the second antenna body 250 to the second feeding surface 270. In this time, a distance in which the plurality of the second partitions 281-286 is extended from the second radiation surface 260 to the second feeding surface 270, i.e., a thickness (D2) of the plurality of the second partitions 281-286 may be less than a height (H) of the second antenna body 250. Particularly, the thickness (D2) of the plurality of the second partitions 281-286 may be sufficiently thin and in this case, the plurality of the second partitions 281-286 may have a plate shape.

A length (L2) in which the plurality of the second partitions 281-286 is protruded from the second inner surface 252 of the second antenna body 250 to the first outer surface 211 of the first antenna body 210 may be constant. As a result, a vertical cross section of the plurality of the second partitions 281-286, i.e., a cross section parallel with the central axis (C) may have a rectangular shape.

A width (W3) of the plurality of the second partitions 281-286 may be constant regardless of a distance from the second radiation surface 260 of the second antenna body 250. As a result, the plurality of the second partitions 281-286 may have a rectangular shape when viewed from the central axis (C) of the second antenna body 250.

As mentioned above, the plurality of the second partitions 281-286 may have a polygon column shape in which a bottom has a polygon shape formed by two straight lines facing and being parallel to each other, and two arcs parallel to each other, according to the thickness (D2) of the second partitions 281-286. In addition, when the thickness (D2) of the plurality of the second partitions 281-286 is sufficiently thin, the plurality of the first partitions 241-246 may be a polygon-shaped plate having two straight lines facing and being parallel to each other, and two arcs parallel to each other.

The plurality of the first and second partitions 241-246 and 281-286, and the first and second antenna body 210 and 250 may be formed of electrically conductive material, and the plurality of the first and second partitions 241-246 and 281-286, and the first and second antenna body 210 and 250 may be integrally manufactured or individually manufactured and then assembled together.

The first radiation surface 220 may be divided into the plurality of the first radiation apertures 221-226 by the plurality of the first partitions 241-246, and the second radiation surface 260 may be divided into the plurality of the second radiation apertures 261-266 by the plurality of the second partitions 281-286.

The structures of the first and second radiation apertures 221-226 and 261-266 are the same as the structures of the first and second radiation apertures 121-126 and 161-166 shown in FIG. 12, and thus a detailed description thereof will be replaced by the description of structures of the first and second radiation apertures 121-126 and 161-166 shown in FIG. 12.

A first feeding pin 231 configured to supply power to the first antenna 201a may be provided on the first feeding surface 230 of the first antenna body 210, and a second feeding pin 271 configured to supply power to the second antenna 201b may be provided on the second feeding surface 270 of the second antenna body 250.

The structure and function of the first and second feeding pin s231 and 271 is the same as the structure and function of the first and second feeding pins 131 and 171 shown in FIGS. 7 to 10, and thus a detailed description thereof will be replaced by the description of structures and functions of the first and second feeding pins 131 and 171 shown in FIGS. 7 to 10.

A high frequency radio wave generated in the inside of the first antenna 201a by the first feeding pin 231 may be divided by the plurality of the first partitions 241-246 and then radiated via of the first radiation apertures 221-226 formed in the first radiation surface 220. A high frequency radio wave generated in the inside of the second antenna 201b by the second feeding pin 271 may be divided by the plurality of the second partitions 281-286 and then radiated via of the second radiation apertures 261-266 formed in the second radiation surface 260

At this time, since a distance, in which each of the radio waves radiated via the first radiation apertures 221-226 is radiated in the inside of the first antenna 201a, may be the same as each other, a phase and amplitude of the radio wave radiated through the first radiation apertures 221-226 may be the same as each other. In addition, since a distance, in which each of the radio waves radiated via the second radiation apertures 261-266 is radiated in the inside of the second antenna 201b, may be the same as each other, a phase and amplitude of the radio wave radiated through the second radiation apertures 261-266 may be the same as each other.

Therefore, the radio wave radiated from the first antenna 201a and the second antenna 201b may have the directivity, respectively.

Hereinafter an antenna radiating a radio wave having directivity will be described according to exemplary embodiments of the present disclosure.

Figure 17:
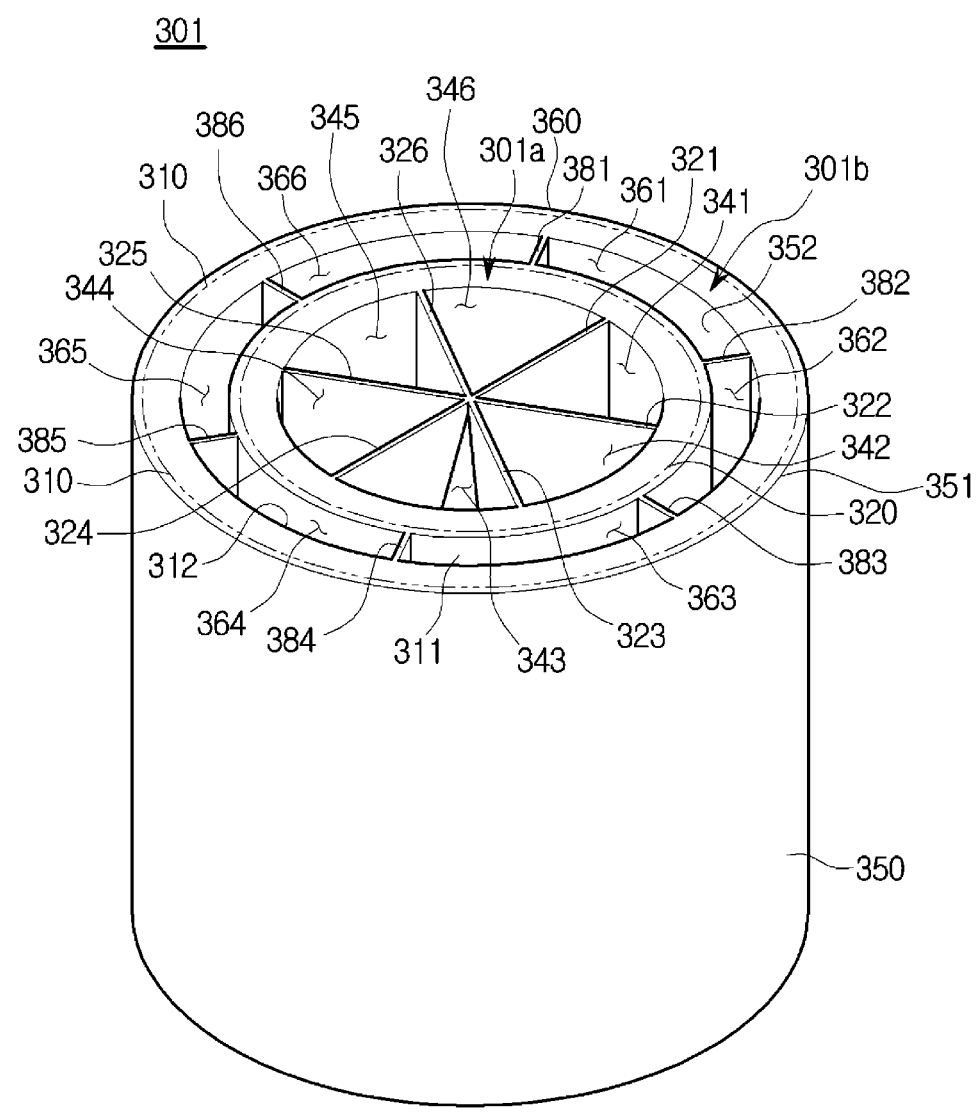
FIG. 17 is a view illustrating an antenna structure in accordance with exemplary embodiments of the present disclosure.
Figure 18:
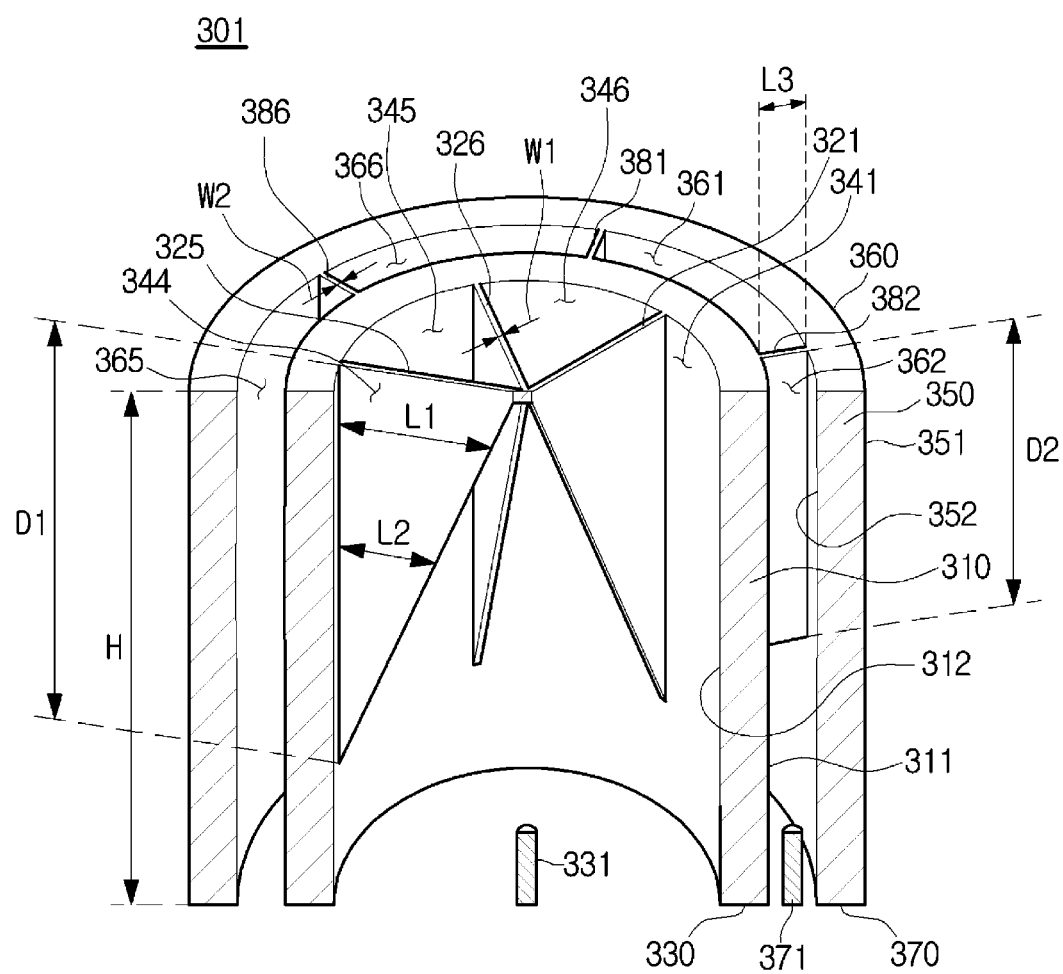
FIG. 18 is a vertical cross-sectional view illustrating the antenna structure shown in FIG. 17.
Figure 19:
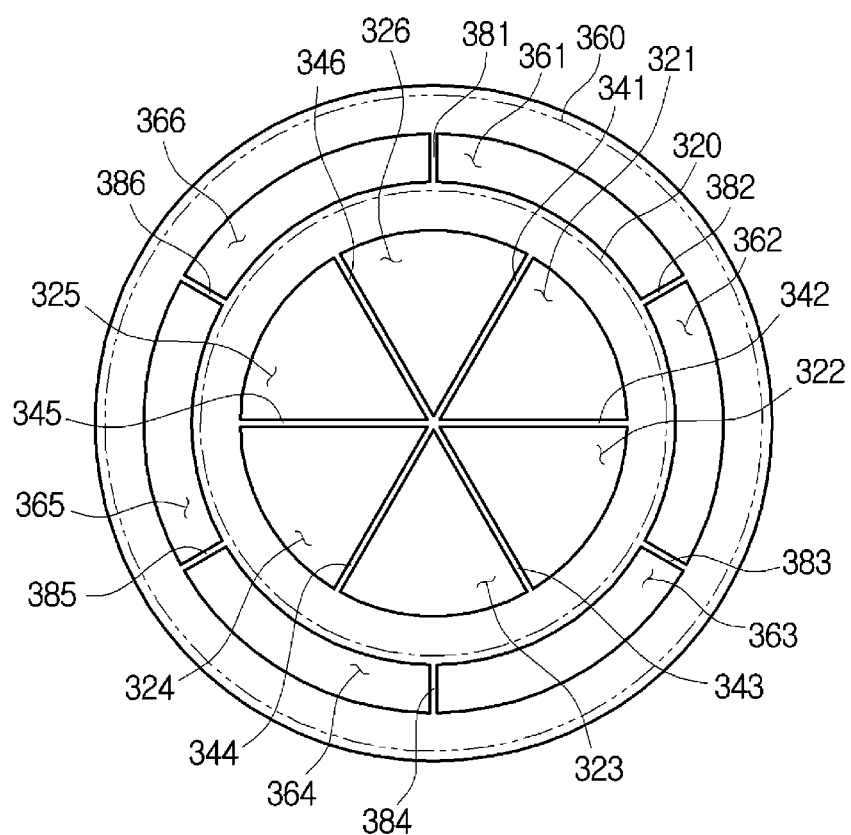
FIG. 19 is a view illustrating a radiation aperture of the antenna structure shown in FIG. 17.

FIG. 17 is a view illustrating an antenna structure in accordance with exemplary embodiments of the present disclosure. FIG. 18 is a vertical cross-sectional view illustrating the antenna structure shown in FIG. 17. FIG. 19 is a view illustrating a radiation aperture of the antenna structure shown in FIG. 17.

Referring to FIGS. 17 to 19, an antenna structure 301 may include a first antenna 301a and a second antenna 301b.

The first antenna 301a may include a first antenna body 310 wherein the first antenna body 310 may include a first radiation surface 320, a first feeding surface 330, a first outer surface 311 and a first inner surface 312. Further, the second antenna 301b may include a second antenna body 350 wherein the second antenna body 350 may include a second radiation surface 360, a second feeding surface 370, a second outer surface 351 and a second inner surface 352.

The structure of the first and second antenna body 310 and 350 is the same as the structure of the first and second antenna body 110 and 150 shown in FIG. 5, and thus a detailed description thereof will be replaced by the description of structure of the first and second antenna body 110 and 150 shown in FIG. 5.

In the inside of the first antenna body 310, a plurality of first partitions 341, 342, 343, 344, 345 and 346 may be provided.

The plurality of the first partitions 341-346 may be protruded from the first inner surface 312 of the first antenna body 310 to a central axis (C) of the first antenna body 310. Due to the plurality of the first partitions 341-346, a part of the first radiation surface 320 of the first antenna body 310 may be closed, and a plurality of first radiation apertures 321-326 may be formed between the plurality of the first partitions 341-346.

However, the arrangement and the number of the plurality of the first partitions 341-346 may be not limited to those shown in FIGS. 17 and 18.

The plurality of the first partitions 341-346 may make contact with each other around the central axis (C) of the first antenna body 310. Since the plurality of the first partitions 341-346 makes contact with each other around the central axis (C) of the first antenna body 310, the area around of the center (C1) of the first radiation surface 320 may be closed.

The plurality of the first partitions 341-346 may be formed in a thin plate shape and a width (W) thereof may be constant.

The plurality of the first partitions 341-346 may be downwardly extended from the first radiation surface 320 of the first antenna body 310 to the first feeding surface 330. In this time, a distance (D1) in which the plurality of the first partitions 341-346 is extended from the first radiation surface 320 to the first feeding surface 330 may be less than a height (H) of the first antenna body 310.

In addition, a length (L1 and L2) in which the plurality of the first partitions 341-346 is protruded from the first inner surface 312 of the first antenna body 310 to the central axis (C) may vary inversely with a distance from the first radiation surface 320. Particularly, the length (L1) in which the plurality of the first partitions 341-346 adjacent to the first radiation surface 320 of the first antenna body 310 is extended to the central axis (C) may be larger than the length (L2) in which the plurality of the first partitions 341-346 adjacent to the first feeding surface 330 is extended from to the central axis (C).

As a result, the plurality of the first partitions 341-346 may have a right triangle shape.

Between the first antenna body 310 and the second antenna body 350, a plurality of second partitions 381, 382, 383, 384, 385 and 386 may be provided.

The plurality of the second partitions 381-386 may be protruded from the second inner surface 352 of the second antenna body 350 to the first outer surface 311 of the first antenna body 310. Due to the plurality of the second partitions 381-386, a part of the second radiation surface 360 of the second antenna body 350 may be closed, and a plurality of second radiation apertures 361-366 may be formed between the plurality of the second partitions 381-386.

However, the arrangement and the number of the plurality of the second partitions 381-386 may be not limited to those shown in FIGS. 17 and 18.

The plurality of the second partitions 381-386 may make contact with the first antenna body 310. As a result, the plurality of the second radiation apertures 361-366 formed by the plurality of the second partitions 381-386 may not communicate with each other.

The plurality of the second partitions 381-386 may be formed in a thin plate shape and a width (W2) thereof may be constant.

The plurality of the second partitions 381-386 may be downwardly extended from the second radiation surface 360 of the second antenna body 350 to the second feeding surface 370. At this time, a distance (D2) in which the plurality of the second partitions 381-386 is extended from the second radiation surface 360 to the second feeding surface 370 may be less than a height (H) of the second antenna body 350.

A length (L3) in which the plurality of the second partitions 381-386 is protruded from the second inner surface 352 of the second antenna body 350 to the first outer surface 311 of the first antenna body 310 may be constant. As a result, a vertical cross section of the plurality of the second partitions 381-386, i.e., a cross section parallel with the central axis (C) may have a rectangular shape.

A width (W2) of the plurality of the second partitions 381-386 may be constant regardless of a distance from the second radiation surface 360 of the second antenna body 350. As a result, the plurality of the second partitions 381-386 may have a rectangular shape when viewed from the central axis (C) of the second antenna body 350.

As mentioned above, the plurality of the second partitions 381-386 may have a polygon column shape in which a bottom thereof has a polygon shape formed by two straight lines facing and being parallel to each other and two arcs parallel to each other, according to the width (W2) of the plurality of the second partitions 381-386. In addition, when the width (W2) of the plurality of the second partitions 381-386 is sufficiently thin, the plurality of the second partitions 381-386 may be a rectangular-shaped plate.

The plurality of the first and second partitions 341-346 and 381-386, and the first and second antenna bodies 310 and 350 may be formed of electrically conductive material, and the plurality of the first and second partitions 341-346 and 381-386, and the first and second antenna body 310 and 350 may be integrally manufactured or individually manufactured and then assembled together.

As illustrated in FIG. 19, the first radiation surface 320 may be divided into the plurality of the first radiation apertures 321-326 by the plurality of the first partitions 341-346, and the second radiation surface 360 may be divided into the plurality of the second radiation apertures 361-366 by the plurality of the second partitions 381-386.

The number of the first and second radiation apertures 321-326 and 361-366 may be determined by the number of the first and second partitions 341-346 and 381-386. In addition, an area of the first and second radiation apertures 321-326 and 361-366 may be determined by an area occupied by the first and second partitions 341-346 and 381-386.

The plurality of the first radiation apertures 321-326 may have a sector shape in which the central axis (C) of the first radiation surface 320 corresponds to a vertex, and the plurality of the second radiation apertures 361-366 may have a polygon shape formed by two straight lines facing and being parallel to each other, and two arcs parallel to each other.

When the plurality of the first and second partitions 341-346 and 381-386 is apart from each other by the same distance, each of the area of the first radiation apertures 321-326 may be the same as each other and the area of the second radiation apertures 361-366 may be the same as each other. Alternatively, when the plurality of the first and second partitions 341-346 and 381-386 is irregularly disposed, each of the area of the first radiation apertures 321-326 may be different from each other and each of the area of the second radiation apertures 361-366 may be different from each other Further, a diameter of the first and second radiation surface 320 and 360, a height of the first and second antenna body 310 and 350, and an area of the first and second radiation apertures 321-326 and 361-366 may vary according to a frequency of a radio wave intended to be radiated through the antenna structure 301.

A first feeding pin 331 configured to supply power to the first antenna 301a may be provided on the first feeding surface 330 of the first antenna body 310, and a second feeding pin 371 configured to supply power to the second antenna 301b may be provided on the second feeding surface 370 of the second antenna body 350.

The structure and function of the first and second feeding pin 331 and 371 is the same as the structure and function of the first and second feeding pin 131 and 171 shown in FIGS. 7 to 10, and thus a detailed description thereof will be replaced by the description of a structure and a function of the first and second feeding pin 131 and 171 shown in FIGS. 7 to 10.

A high frequency radio wave generated in the inside of the first antenna 301a by the first feeding pin 331 may be divided by the plurality of the first partitions 341-346 and then radiated via of the first radiation apertures 321-326 formed in the first radiation surface 320. A high frequency radio wave generated in the inside of the second antenna 301b by the radar device 371 may be divided by the plurality of the second partitions 381-386 and then radiated via one of the second radiation apertures 361-366 formed in the second radiation surface 360

At this time, since a distance, in which each of the radio waves radiated via the first radiation apertures 321-326 is radiated in the inside of the first antenna 301a, may be the same with each other, a phase and amplitude of the radio wave radiated through the first radiation apertures 321-326 may be the same as each other. In addition, since a distance, in which each of the radio wave radiated via the second radiation apertures 361-366 is radiated in the inside of the second antenna 301b, may be the same as each other, a phase and amplitude of the radio wave radiated through the second radiation apertures 361-366 may be the same as each other.

As a result, the radio wave radiated from the first antenna 301a and the second antenna 301b may have the directivity, respectively.

Hereinafter an antenna radiating a radio wave having directivity will be described according to exemplary embodiments of the present disclosure.

Figure 20:
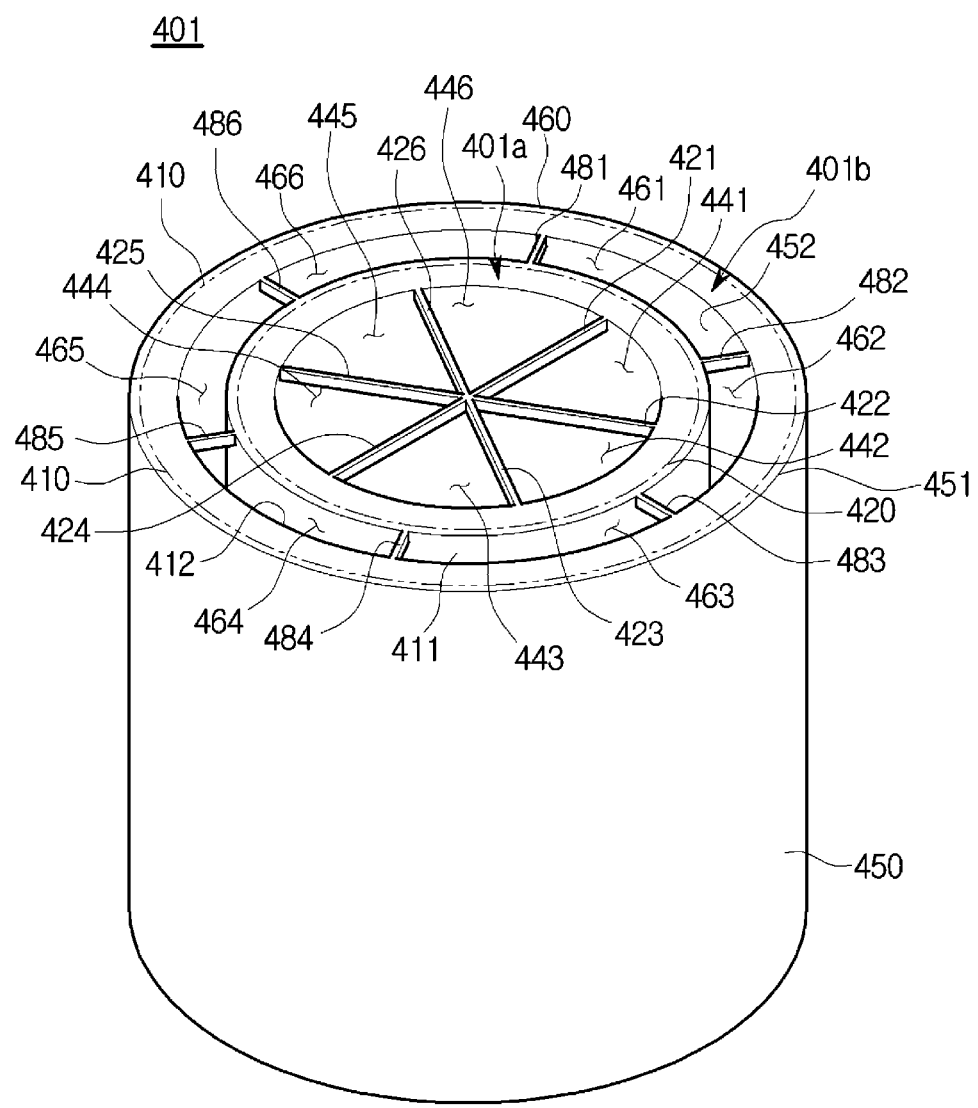
FIG. 20 is a view illustrating an antenna structure in accordance with exemplary embodiments of the present disclosure.
Figure 21:
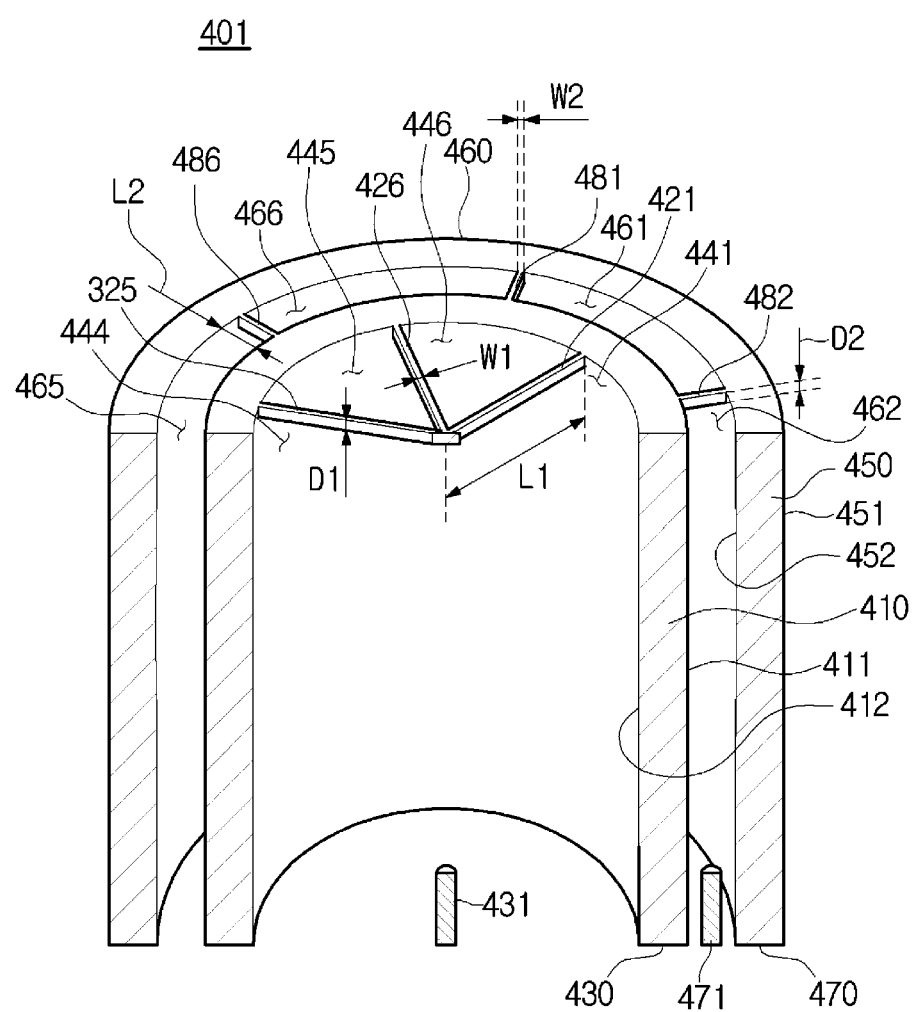
FIG. 21 is a vertical cross-sectional view illustrating the antenna structure shown in FIG. 20.

FIG. 20 is a view illustrating an antenna structure in accordance with exemplary embodiments of the present disclosure. FIG. 21 is a vertical cross-sectional view illustrating the antenna structure shown in FIG. 20.

Referring to FIGS. 20 and 21, an antenna structure 401 may include a first antenna 401a and a second antenna 401b.

The first antenna 401a may include a first antenna body 410 wherein the first antenna body 410 may include a first radiation surface 420, a first feeding surface 430, a first outer surface 411 and a first inner surface 412. Further, the second antenna 401*b* may include a second antenna body 450 wherein the second antenna body 450 may include a second radiation surface 460, a second feeding surface 470, a second outer surface 451 and a second inner surface 452.

The structure of the first and second antenna body 410 and 450 is the same as the structure of the first and second antenna body 110 and 150 shown in FIG. 5, and thus a detailed description thereof will be replaced by the description of a structure of the first and second antenna body 110 and 150 shown in FIG. 5.

In the inside of the first antenna body 410, a plurality of first partitions 441, 442, 443, 444, 445 and 446 may be provided.

The plurality of the first partitions 441-446 may be protruded from the first inner surface 412 of the first antenna body 410 to a central axis (C) of the first antenna body 410. A plurality of first radiation apertures 421-426 may be formed between the plurality of the first partitions 441-446.

However, the arrangement and the number of the plurality of the first partitions 441-446 may be not limited to those shown in FIGS. 20 and 21.

The plurality of the first partitions 441-446 may make contact with each other around the central axis (C) of the first antenna body 410. Since the plurality of the first partitions 441-446 makes contact with each other around the central axis (C) of the first antenna body 410, the area around of the center (C1) of the first radiation surface 420 may be closed.

A length (L1) in which the plurality of the first partitions 441-446 is protruded from the first inner surface 412 to the central axis (C) may be constant. In addition, a width (W1) of the plurality of the first partitions 441-446 may be also constant and the width (W1) of the plurality of the first partitions 441-446 may be sufficiently thin.

The plurality of the first partitions 441-446 may be downwardly extended from the first radiation surface 420 of the first antenna body 410 to the first feeding surface 430. At this time, a distance in which the plurality of the first partitions 441-446 is extended from the first radiation surface 420 to the first feeding surface 430, i.e., a thickness (D1) may be constant and the thickness (D1) of the plurality of the first partitions 441-446 may be sufficiently thin.

When the width (W1) and the thickness (D1) of the plurality of the first partitions 441-446 are sufficiently thin, the plurality of the first partitions 441-446 may have a wire shape.

Between the first antenna body 410 and the second antenna body 450, a plurality of second partitions 481, 482, 483, 484, 485 and 486 may be provided.

The plurality of the second partitions 481-486 may be protruded from the second inner surface 452 of the second antenna body 450 to the first outer surface 411 of the first antenna body 410. Due to the plurality of the second partitions 481-486, a part of the second radiation surface 460 of the second antenna body 450 may be closed, and a plurality of second radiation apertures 461-466 may be formed between the plurality of the second partitions 481-486.

However, the arrangement and the number of the plurality of the second partitions 481-486 may be not limited to those shown in FIGS. 20 and 21.

The plurality of the second partitions 481-486 may make contact with the first antenna body 410. As a result, the plurality of the second radiation apertures 461-466 formed by the plurality of the second partitions 481-486 may not communicate with each other.

A length (L2) in which the plurality of the second partitions 481-486 is protruded from the second inner surface 452 of the second antenna body 450 to the first outer surface 411 of the first antenna body 410 may be constant. In addition, a width (W2) of the plurality of the second partitions 481-486 may be also constant and the width (W2) of the plurality of the second partitions 481-486 may be sufficiently thin.

The plurality of the second partitions 481-486 may be downwardly extended from the second radiation surface 460 of the second antenna body 450 to the second feeding surface 470. At this time, a distance in which the plurality of the second partitions 481-486 is extended from the second radiation surface 460 to the second feeding surface 470, i.e., a thickness (D2) may be constant and the thickness (D2) of the plurality of the second partitions 481-486 may be sufficiently thin.

When the width (W2) and the thickness (D2) of the plurality of the second partitions 481-486 are sufficiently thin, the plurality of the second partitions 481-486 may have a wire shape.

The plurality of the first and second partitions 441-446 and 481-486, and the first and second antenna body 410 and 450 may be formed of electrically conductive material, and the plurality of the first and second partitions 441-446 and 481-486, and the first and second antenna body 410 and 450 may be integrally manufactured or individually manufactured and then assembled together.

The first radiation surface 420 may be divided into the plurality of the first radiation apertures 421-426 by the plurality of the first partitions 441-446, and the second radiation surface 460 may be divided into the plurality of the second radiation apertures 461-466 by the plurality of the second partitions 481-486.

The structure of the first and second radiation apertures 421-426 and 461-466 is the same as the structure of the first and second radiation apertures 321-326 and 361-366 shown in FIG. 19, and thus a detailed description thereof will be replaced by the description of structure of the first and second radiation apertures 321-326 and 361-366 shown in FIG. 19.

A first feeding pin 431 configured to supply power to the first antenna 401*a* may be provided on the first feeding surface 430 of the first antenna body 410, and a second feeding pin 471 configured to supply power to the second antenna 401*b* may be provided on the second feeding surface 470 of the second antenna body 450.

The structure and function of the first and second feeding pins 431 and 471 is the same as the structure and function of the first and second feeding pins 131 and 171 shown in FIGS. 7 to 10, and thus a detailed description thereof will be replaced by the description of structure and function of the first and second feeding pins 131 and 171 shown in FIGS. 7 to 10.

A high frequency radio wave generated in the inside of the first antenna 401*a* by the first feeding pin 431 may be divided by the plurality of the first partitions 441-446 and then radiated via one of the first radiation apertures 421-426 formed in the first radiation surface 420. A high frequency radio wave generated in the inside of the second antenna 401*b* by the second feeding pin 471 may be divided by the plurality of the second partitions 481-486 and then radiated via one of the second radiation apertures 461-466 formed in the second radiation surface 460.

At this time, since a distance, in which each of the radio wave radiated via the first radiation apertures 421-426 is radiated in the inside of the first antenna 401*a*, may be the same as each other, a phase and amplitude of the radio wave radiated through the first radiation apertures 421-426 may be the same as each other. In addition, since a distance, in which each of the radio waves radiated via the first radiation apertures 461-466 is radiated in the inside of the second antenna 401*b*, may be the same as each other, a phase and amplitude of the radio wave radiated through the second radiation apertures 461-466 may be the same as each other.

As a result, the radio wave radiated from the first antenna 401*a* and the second antenna 401*b* may have the directivity, respectively.

Hereinbefore the antenna structure 101, 201, 301 and 401 having a hollow cylindrical shape or a cylindrical shape has been described, but the shape of the antenna structure is not limited to the hollow cylindrical shape or the cylindrical shape. For example, the antenna structure may have a truncated cone shape in which a diameter of the radiation surface is different from a diameter of the feeding surface.

Hereinafter an operation of an antenna 100 including the antenna structure will be described.

Figure 22:
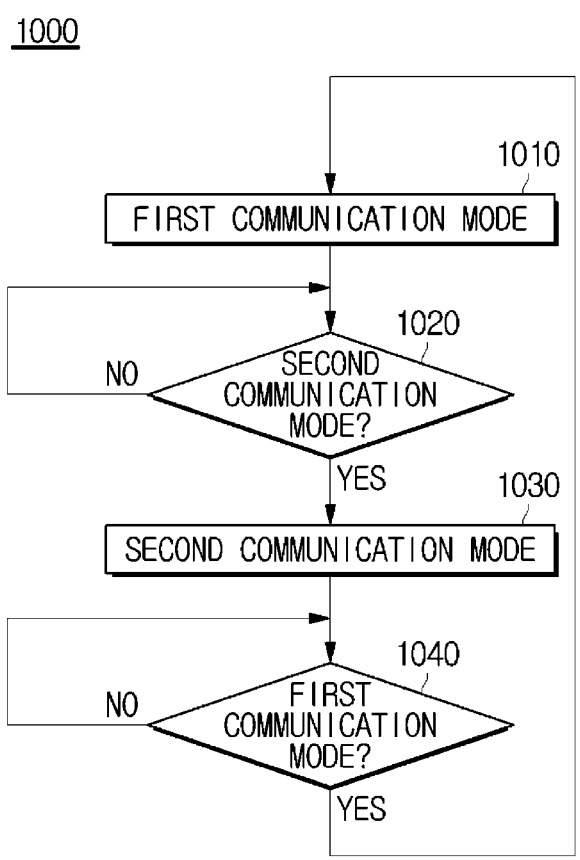
FIG. 22 is a flowchart illustrating operations of an antenna included in a vehicle in accordance with exemplary embodiments of the present disclosure.
Figure 23:
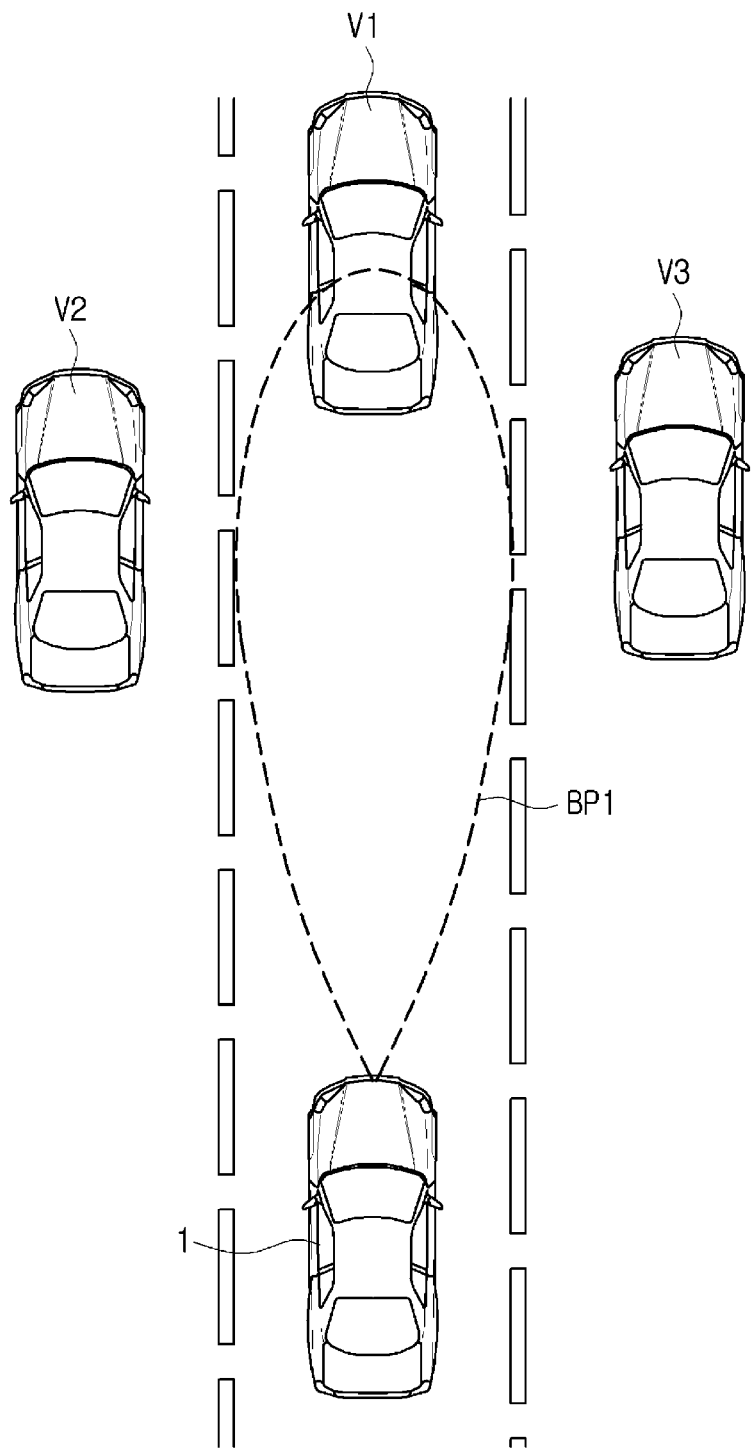
FIGS. 23 and 24 are views illustrating a radiation pattern of an antenna included in a vehicle in accordance with exemplary embodiments of the present disclosure.
Figure 24:
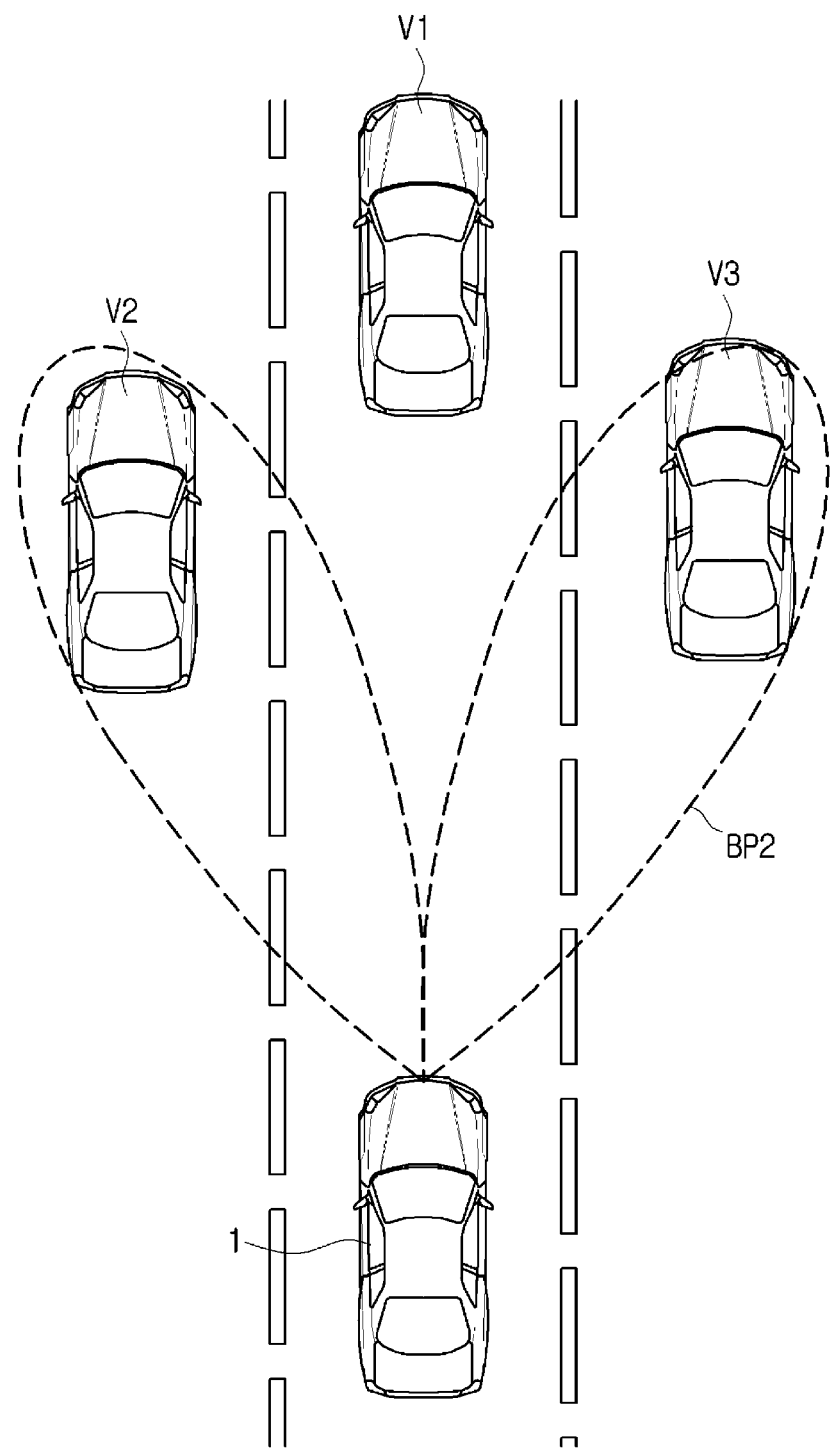

FIG. 22 is a view illustrating an operation of an antenna included in a vehicle in accordance with exemplary embodiments of the present disclosure. FIGS. 23 and 24 are views illustrating a radiation pattern of the antenna included in the vehicle in accordance with n exemplary embodiments of the present disclosure.

An operation 1000 of the antenna 100 will be described with reference to FIGS. 22 to 24.

The antenna 100 may be operated in a first communication mode (1010).

During the first communication mode, the antenna 100 may activate the first antenna 101*a*.

Particularly, the selection controller 103 of the antenna 100 may provide a first antenna selection signal to select the first antenna 101*a* to the selector switch 102. In addition, the selector switch 102 receiving the first antenna selection signal may activate the first antenna 101*a* and inactivate the second antenna 101*b*.

As a result, as illustrated in FIG. 23, a first radiation pattern (BP1) may be generated by the first antenna 101*a*. In other words, the first antenna 101*a* may radiate a radio wave having directivity, and the radio wave radiated from the first antenna 101*a* may have directivity toward the front of the vehicle 1. Therefore, the vehicle 1 may communicate with a first vehicle (V1) in a front direction.

During the first communication mode, the antenna 100 may determine whether to switch to a second communication mode (1020).

The antenna 100 may be switched to the second communication mode according to various conditions.

For example, when a signal strength, which is received by the first antenna 101*a* activated during the first communication mode, is less than a first reference strength, the selector switch 102 may switch the operation mode of the antenna 100 to the second communication mode.

In another example, when a second communication mode switch signal is received from the radar controller 46 or the communication controller 57 during the first communication mode, the selector switch 102 may switch the operation mode of the antenna 100 to the second communication mode.

When a condition for switching to the second communication mode is achieved (YES of 1020), the antenna 100 may be operated in the second communication mode (1030).

During the second communication mode, the antenna 100 may activate the second antenna 101*b*. Particularly, the selection controller 103 of the antenna 100 may provide a second antenna selection signal to select the second antenna 101*b* to the selector switch 102. In addition, the selector switch 102 receiving the second antenna selection signal may activate the second antenna 101*b* and inactivate the first antenna 101*a*.

As a result, as illustrated in FIG. 24, a second radiation pattern (BP2) may be generated by the second antenna 101*b*. In other words, the second antenna 101*b* may radiate a radio wave having directivity, and the radio wave radiated from the second antenna 101*b* may have directivity toward a direction that is deviated from the front of the vehicle 1 with a predetermined angle. Therefore, the vehicle 1 may communicate with a second vehicle (V2) or a third vehicle (V3) in front of the vehicle 1.

During the second communication mode, the antenna 100 may determine whether to switch to the first communication mode (1040).

The antenna 100 may be switched to the first communication mode according to various conditions.

For example, when a signal strength, which is received by the second antenna 101*b* activated during the second communication mode, is less than a second reference strength, the selector switch 102 may switch the operation mode of the antenna 100 to the first communication mode.

In another example, when a first communication mode switch signal is received from the radar controller 46 or the communication controller 57 during the second communication mode, the selector switch 102 may switch the operation mode of the antenna 100 to the first communication mode.

When a condition for switching to the first communication mode is achieved (YES of 1040), the antenna 100 may be operated in the first communication mode (1010).

As mentioned above, the antenna 100 may be set as the first communication mode or the second communication mode. Further, the radiation pattern of the radio wave radiated by the antenna 100 in the first communication mode and the radiation pattern of the radio wave radiated by the antenna 100 in the second communication mode may be different from each other.

As is apparent from the above description, according to the proposed antenna and vehicle having the same, it may be possible to minimize a space occupied by the antenna.

In addition, it may be possible to provide the antenna having a shape similar to a cable capable of transmitting a high frequency electrical signal and a vehicle having the same.

It may be possible to provide the antenna capable of outputting radio waves having a directional radial pattern and a vehicle having the same.

It may also be possible to provide the antenna structure having a plurality of antenna capable of outputting radio waves having a directional radial pattern and a vehicle having the same.

Although exemplary embodiments of the present disclosure have been shown and described, it would be appreciated by those skilled in the art that changes may be made to these embodiments without departing from the principles and spirit of the disclosure, the scope of which is defined in the claims and their equivalents.

What is claimed is:

1. An antenna comprising:
   a first antenna body formed as a hollow cylindrical shape having a first outer surface, a first inner surface and a first radiation surface formed in a circular shape;
   a second antenna body accommodating the first antenna body inside the second antenna body, the second antenna body formed as a hollow cylindrical shape with a second outer surface, a second inner surface and a second radiation surface formed in a ring shape;

a plurality of first partitions protruding from the first inner surface to a central axis of the first antenna body; and a plurality of second partitions protruding from the second inner surface to the first outer surface of the first antenna body, wherein a plurality of first radiation apertures, formed by the plurality of first partitions for radiating a first radio wave, is formed on the first radiation surface, and a plurality of second radiation apertures, formed by the plurality of second partitions for radiating a second radio wave, is formed on the second radiation surface.

2. The antenna of claim 1, wherein each of the plurality of the first radiation apertures are apart from each other by the same distance along the first inner surface of the first antenna body.

3. The antenna of claim 1, wherein each of the first radiation apertures has a sector shape in which the central axis of the first antenna body corresponds to a vertex.

4. The antenna of claim 1, wherein each of the plurality of the first partitions make contact with each other in the central axis of the first antenna body.

5. The antenna of claim 1, wherein a cross section of each of the first partitions in the first radiation surface has a sector shape, and each of the first partitions has a sector-shaped cone shape, which is extended from the first radiation surface along the first inner surface.

6. The antenna of claim 1, wherein a cross section of each of the first partitions in the first radiation surface has a sector shape, and each of the first partitions has a sector-shaped cylindrical shape, which is extended from the first radiation surface along the first inner surface.

7. The antenna of claim 1, wherein each of the first partitions is extended from the first inner surface to the central axis of the first antenna body along the first radiation surface and a length protruded toward the central axis varies inversely with a distance from the first radiation surface.

8. The antenna of claim 1, wherein each of the first partitions is extended from the first inner surface to the central axis of the first antenna body along the first radiation surface and a length protruded toward the central axis is constant.

9. The antenna of claim 1, wherein each of the plurality of the second radiation apertures are apart from each other by the same distance along the second inner surface of the second antenna body.

10. The antenna of claim 1, wherein the plurality of the second radiation apertures is formed between the first outer surface of the first antenna body and the second inner surface of the second antenna body.

11. The antenna of claim 1, wherein the plurality of the second radiation apertures has a ring shape that is cut by the second partition.

12. The antenna of claim 1, wherein each of the second partitions is extended from the second inner surface to the central axis of the second antenna body along the second radiation surface and a width of the second partition varies inversely with a distance from the second radiation surface.

13. The antenna of claim 1, wherein each of the second partitions is extended from the second inner surface to the central axis of the second antenna body along the second radiation surface and a width of the second partition is constant.

14. A vehicle comprising:

a first antenna and a second antenna; and a selection controller for activating any one of the first antenna and the second antenna, wherein the first antenna comprises:

a first antenna body formed as a hollow cylindrical shape having a first outer surface, a first inner surface and a first radiation surface formed in a circular shape; and a plurality of first partitions protruded from the first inner surface to a central axis of the first antenna body; and the second antenna comprises:

a second antenna body accommodating the first antenna body inside the second antenna body and formed as a hollow cylindrical shape having a second outer surface, a second inner surface and a second radiation surface in a ring shape; and a plurality of second partitions protruded from the second inner surface to the first outer surface of the first antenna body, wherein a plurality of first radiation apertures formed by the plurality of first partitions for radiating a first radio wave is formed in the first radiation surface and, a plurality of second radiation apertures formed by the plurality of second partitions for radiating a second radio wave is formed in the second radiation surface.

15. The vehicle of claim 14, wherein the plurality of the first and second radiation apertures are apart from each other by the same distance along the first and second inner surface.

16. The vehicle of claim 14, wherein each of the plurality of the first radiation apertures has a sector shape in which the central axis of the first antenna body corresponds to vertex.

17. The vehicle of claim 14, wherein each of the plurality of the first partitions makes contact with each other in the central axis of the first antenna body.

18. The vehicle of claim 14, wherein the plurality of the second radiation apertures is formed between the first outer surface of the first antenna body and the second inner surface of the second antenna body.

19. The vehicle of claim 14, wherein the first antenna further comprises a first feeding pin provided inside of the first antenna body for radiating the first radio wave to the inside of the first antenna body, and the second antenna further comprises a second feeding pin provided between the first antenna body and the second antenna body radiates the second radio wave to between the first antenna body and the second antenna body.

20. The vehicle of claim 14, wherein the first radio wave radiated from the first feeding pin is divided by the plurality of the first partitions and radiated via the plurality of the first radiation apertures, and the second radio wave radiated from the second feeding pin is divided by the plurality of the second partitions and radiated via the plurality of the second radiation apertures.

* * * * *